(12) United States Patent
Asterjadhi et al.

(10) Patent No.: US 10,779,315 B2
(45) Date of Patent: Sep. 15, 2020

(54) TRAFFIC IDENTIFIER BASED BUFFER STATUS REPORTING

(71) Applicant: QUALCOMM Incorporated, San Diego, CA (US)

(72) Inventors: Alfred Asterjadhi, San Diego, CA (US); George Cherian, San Diego, CA (US); Abhishek Pramod Patil, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/270,382

(22) Filed: Feb. 7, 2019

(65) Prior Publication Data

US 2019/0261402 A1 Aug. 22, 2019

Related U.S. Application Data

(60) Provisional application No. 62/633,019, filed on Feb. 20, 2018.

(51) Int. Cl.
*H04W 72/12* (2009.01)
*H04W 80/02* (2009.01)
*H04W 84/12* (2009.01)

(52) U.S. Cl.
CPC ........ *H04W 72/1284* (2013.01); *H04W 80/02* (2013.01); *H04W 84/12* (2013.01)

(58) Field of Classification Search
CPC . H04W 72/1284; H04W 80/02; H04W 84/04; H04W 88/06; H04W 84/12; H04L 12/4604

See application file for complete search history.

(56) References Cited

U.S. PATENT DOCUMENTS

| 8,902,741 | B2* | 12/2014 | Zhu | H04W 28/0278 |
| | | | | 370/229 |
| 10,306,603 | B1* | 5/2019 | Chu | H04W 72/1284 |
| 2017/0332385 | A1* | 11/2017 | Shirali | H04W 28/0268 |

FOREIGN PATENT DOCUMENTS

| EP | 3007514 A2 | 4/2016 |
| WO | WO-2017142357 A1 | 8/2017 |
| WO | WO-2017196658 A1 | 11/2017 |

OTHER PUBLICATIONS

International Search Report and Written Opinion—PCT/US2019/017343—ISA/EPO—dated Apr. 23, 2019.

* cited by examiner

*Primary Examiner* — Sharad Rampuria
(74) *Attorney, Agent, or Firm* — Kevin M. Donnelly; Holland & Hart LLP

(57) ABSTRACT

A wireless station may buffer data associated with one or more traffic identifiers (TIDs), and generate a media access control (MAC) protocol data unit (MPDU) including TID-specific buffer status report (BSR) information. A BSR control field may include an Access Category Identifier (ACI) bitmap and a delta TID parameter indicating a mapping of TID-specific buffer status information to a first and second queue size indicated by the BSR. In some cases, the MPDU may also include a quality of service (QoS) control field, and queue sizes indicated by the BSR control field and QoS control field may be accumulated for reporting buffer status for a TID. Additionally or alternatively, a transmitting wireless station may generate an aggregated MPDU (A-MPDU) including multiple MPDUs with different A-control fields based on a receiving capabilities information field indicating a number of different aggregated control (A-Control) fields the receiving wireless station supports.

30 Claims, 14 Drawing Sheets

TRAFFIC IDENTIFIER BASED BUFFER STATUS REPORTING

CROSS REFERENCES

The present Application for Patent claims the benefit of U.S. Provisional Patent Application No. 62/633,019 by ASTERJADHI et al., entitled "IMPROVED TRAFFIC IDENTIFIER BASED BUFFER STATUS REPORTING," filed Feb. 20, 2018, assigned to the assignee hereof, and expressly incorporated herein.

BACKGROUND

The following relates generally to wireless communications, and more specifically to improved traffic identifier (TID) based buffer status reporting.

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a wireless local area network (WLAN), such as a Wi-Fi (i.e., Institute of Electrical and Electronics Engineers (IEEE) 802.11) network may include AP that may communicate with one or more stations (STAs) or mobile devices. The access point (AP) may be coupled to a network, such as the Internet, and may enable a mobile device to communicate via the network (or communicate with other devices coupled to the access point). A wireless device may communicate with a network device bi-directionally. For example, in a WLAN, a wireless station (e.g., a STA) may communicate with an associated AP via downlink and uplink. The downlink (or forward link) may refer to the communication link from the AP to the station, and the uplink (or reverse link) may refer to the communication link from the station to the AP.

Wireless devices may transmit a buffer status report (BSR) that indicates a presence or amount of buffered data that is to be transmitted. BSRs may indicate a number of packets or a size (e.g., in Mbytes or octets) of data in a transmission buffer of the wireless device. For example, an AP may receive a BSR from a STA and allocate uplink resources to the STA. A scheduler of the AP may decide which STA (or group of STAs) and which TID may be assigned to uplink resources for an uplink transmission during a particular time. In some examples, a STA may have a relatively large amount of buffered data to report, prioritized buffered data to report, etc., which may result in increased overhead (e.g., resulting from segmented BSRs to convey STA needs) and decreased system performance (e.g., such as latency associated with conveying buffer information for prioritized TID communications).

SUMMARY

The described techniques relate to improved methods, systems, devices, or apparatuses that support improved traffic identifier (TID) based buffer status reporting. Techniques described provide for buffer status reporting with finer granularity (e.g., buffer status report (BSR) control fields with TID differentiation) and increased range (e.g., BSR control field and quality of service (QoS) control field buffer queue size accumulation). In a wireless local area network (WLAN), an access point (AP) may allocate uplink resources to multiple stations (STAs) that share a communication medium. STAs may send BSRs to an AP for efficient allocation of limited uplink resources. According to techniques described herein, wireless devices may differentiate for which TID buffer status reporting is being signaled, and may additionally or alternatively report an increased range (e.g., a larger amount) of buffered data sizes.

A wireless device (e.g., a STA) may buffer data associated with one or more TIDs, and generate a media access control (MAC) protocol data unit (MPDU) including TID-specific buffer status report BSR information. That is, MPDUs may be generated with TID differentiated BSR control fields. A BSR control field may include an Access Category Identifier (ACI) bitmap and a delta TID parameter (e.g., a Delta TID subfield) indicating a mapping of TID-specific buffer status information to a first queue (e.g., a Queue Size High subfield) and second queue (e.g., a Queue Size All subfield) included in the BSR control field. In some cases, the ACI bitmap and the Delta TID subfield may collectively indicate one or more values of TID(s) associated with the BSR control field. In other examples, MPDUs may be generated with BSR control fields that include TID bitmaps that explicitly indicate one or more TIDs associated with the BSR control field. In some cases, the MPDU may also include a QoS control field, and queue sizes indicated by the BSR control field and QoS control field may be accumulated (e.g., added together) for increased ranges of reportable buffer sizes. For example, a QoS queue size subfield of a QoS control field, and a Queue Size High subfield and a Queue Size All subfield of a BSR control field may be accumulated such that larger buffer sizes (e.g., more Mbytes of buffered data) may be reported using the accumulated subfields.

Additionally or alternatively, a receiving wireless device may signal a capabilities information field indicating a number of different aggregated control (A-Control) fields the receiving wireless device supports to a transmitting wireless device. Therefore, the transmitting wireless device may generate an aggregated MPDU (A-MPDU) including multiple MPDUs with different A-control fields based on the number of different aggregated control (A-Control) fields the receiving wireless device supports (e.g., based on the received capabilities information field). The different A-control fields may include BSR control fields, Operating mode (OM) control fields, HE link adaptation (HLA) control fields, uplink power headroom (UPH) control fields, bandwidth query report (BQR) control fields, command and status control fields, etc. Including MPDUs with such different A-control fields within an A-MPDU may provide for decreased control signaling overhead, as an increased amount of control information may be conveyed in an A-MPDU.

A method of wireless communication is described. The method may include buffering, by a first wireless station of a WLAN, data associated with one or more TIDs for transmission to a second wireless station of the WLAN, generating an MPDU including a BSR control field based on the buffering, the BSR control field including an ACI bitmap, a delta TID parameter, a first queue size parameter, and a second queue size parameter; where the ACI bitmap and the delta TID parameter indicate a mapping of buffer status information for the one or more TIDs to the first queue size parameter and the second queue size parameter, and transmitting the MPDU to the second wireless station.

An apparatus for wireless communication is described. The apparatus may include a processor, memory in electronic communication with the processor, and instructions stored in the memory. The instructions may be executable by the processor to cause the apparatus to buffer, by a first wireless station of a WLAN, data associated with one or more TIDs for transmission to a second wireless station of the WLAN, generate an MPDU including a BSR control field based on the buffering, the BSR control field including an ACI bitmap, a delta TID parameter, a first queue size parameter, and a second queue size parameter; where the ACI bitmap and the delta TID parameter indicate a mapping of buffer status information for the one or more TIDs to the first queue size parameter and the second queue size parameter, and transmit the MPDU to the second wireless station.

Another apparatus for wireless communication is described. The apparatus may include means for buffering, by a first wireless station of a WLAN, data associated with one or more TIDs for transmission to a second wireless station of the WLAN, means for generating an MPDU including a BSR control field based on the buffering, the BSR control field including an ACI bitmap, a delta TID parameter, a first queue size parameter, and a second queue size parameter; where the ACI bitmap and the delta TID parameter indicate a mapping of buffer status information for the one or more TIDs to the first queue size parameter and the second queue size parameter, and means for transmitting the MPDU to the second wireless station.

A non-transitory computer-readable medium storing code for wireless communication is described. The code may include instructions executable by a processor to buffer, by a first wireless station of a WLAN, data associated with one or more TIDs for transmission to a second wireless station of the WLAN, generate an MPDU including a BSR control field based on the buffering, the BSR control field including an ACI bitmap, a delta TID parameter, a first queue size parameter, and a second queue size parameter; where the ACI bitmap and the delta TID parameter indicate a mapping of buffer status information for the one or more TIDs to the first queue size parameter and the second queue size parameter, and transmit the MPDU to the second wireless station.

In some examples of the method, apparatuses, and non-transitory computer-readable medium described herein, generating the MPDU includes setting a value of the delta TID parameter to indicate at least a number of the one or more TIDs. In some examples of the method, apparatuses, and non-transitory computer-readable medium described herein, the value of the delta TID parameter indicates that the first queue size parameter and the second queue size parameter collectively correspond to a buffer status for a single TID of the one or more TIDs, and where the ACI bitmap indicates an access category (AC) to which the single TID corresponds to.

In some examples of the method, apparatuses, and non-transitory computer-readable medium described herein, the single TID of the one or more TIDs includes a highest TID of the AC associated with the ACI bitmap or a lowest TID of the AC associated with the ACI bitmap. In some examples of the method, apparatuses, and non-transitory computer-readable medium described herein, the value of the delta TID parameter indicates that the first queue size parameter corresponds to a first buffer status for a first TID of the one or more TIDs and the second queue size parameter corresponds to a second buffer status for a second TID of the one or more TIDs, and where the ACI bitmap indicates an AC to which the first TID and the second TID correspond to.

In some examples of the method, apparatuses, and non-transitory computer-readable medium described herein, the first TID and the second TID include different priority levels. In some examples of the method, apparatuses, and non-transitory computer-readable medium described herein, the value of the delta TID parameter indicates that the first queue size parameter corresponds to a first buffer status of a first TID of the one or more TIDs and the second queue size parameter corresponds to a second buffer status for a plurality of TIDs of the one or more TIDs.

In some examples of the method, apparatuses, and non-transitory computer-readable medium described herein, the generated MPDU further includes a QoS control field based on the buffering, the QoS control field including a third queue size parameter and a TID subfield. In some examples of the method, apparatuses, and non-transitory computer-readable medium described herein, the third queue size parameter and at least one of the first queue size parameter and the second queue size parameter, collectively correspond to a buffer status for a single TID of the one or more TIDs and where the ACI bitmap indicates an AC to which the single TID corresponds to.

In some examples of the method, apparatuses, and non-transitory computer-readable medium described herein, the single TID of the one or more TIDs includes a highest TID of the AC associated with the ACI bitmap or a lowest TID of the AC associated with the ACI bitmap, and where the single TID may be indicated by the TID subfield of the QoS control field and the value of the delta TID parameter. In some examples of the method, apparatuses, and non-transitory computer-readable medium described herein, the TID subfield indicates the third queue size parameter corresponds to a buffer status for a TID other than the one or more TIDs indicated by the value of the delta TID parameter.

In some examples of the method, apparatuses, and non-transitory computer-readable medium described herein, the third queue size parameter corresponds to a buffer status for an AC, and where the AC may be indicated by the TID subfield. In some examples of the method, apparatuses, and non-transitory computer-readable medium described herein, generating the MPDU further includes setting the ACI bitmap to indicate a set of one or more ACs including an AC of the one or more TIDs.

In some examples of the method, apparatuses, and non-transitory computer-readable medium described herein, the set of one or more ACs includes setting an AC high parameter of the BSR control field to indicate an AC of the one or more TIDs. In some examples of the method, apparatuses, and non-transitory computer-readable medium described herein, the one or more TIDs include an AC. In some examples of the method, apparatuses, and non-transitory computer-readable medium described herein, the BSR control field further includes an access category indicator High (ACI High) parameter and a scaling factor parameter.

In some examples of the method, apparatuses, and non-transitory computer-readable medium described herein, the ACI bitmap indicates a single AC, and where the ACI High parameter and the scaling factor parameter collectively correspond to a scaling factor value associated with the first queue size parameter and the second queue size parameter. In some examples of the method, apparatuses, and non-transitory computer-readable medium described herein, the ACI bitmap indicates a single AC, and where the ACI High parameter corresponds to a first scaling factor value associated with the first queue size parameter and the scaling factor parameter corresponds to a second scaling factor value associated with the second queue size parameter.

In some examples of the method, apparatuses, and non-transitory computer-readable medium described herein, generating the MPDU includes setting a value of the ACI bitmap, the delta TID parameter, and the ACI High parameter to collectively indicate the one or more TIDs. In some examples of the method, apparatuses, and non-transitory computer-readable medium described herein, the scaling factor parameter indicates that the first queue size parameter corresponds to a buffer status for a first TID of the one or more TIDs, where the second queue size parameter corresponds to TIDs of the one or more TIDs other than the first TID.

In some examples of the method, apparatuses, and non-transitory computer-readable medium described herein, the value of the ACI bitmap, the delta TID parameter, and the ACI High parameter collectively indicates one TID, and where the first queue size parameter and the second queue size parameter collectively correspond to a buffer status for the one TID.

In some examples of the method, apparatuses, and non-transitory computer-readable medium described herein, the ACI bitmap indicates a value corresponding to a TID of the one or more TIDs. In some examples of the method, apparatuses, and non-transitory computer-readable medium described herein, the first queue size parameter and the second queue size parameter collectively correspond to a buffer status for the TID. In some examples of the method, apparatuses, and non-transitory computer-readable medium described herein, the ACI bitmap and the delta TID parameter collectively indicate a value corresponding to a first TID and a second TID of the one or more TIDs. In some examples of the method, apparatuses, and non-transitory computer-readable medium described herein, the first queue size parameter corresponds to a first buffer status for the first TID and the second queue size parameter corresponds to a second buffer status for the second TID.

A method of wireless communication is described. The method may include receiving, by a first wireless station of a WLAN, a capabilities information field from a second wireless device of the WLAN, the capabilities information field indicating a number of different aggregated control (A-Control) fields that a second wireless device is capable of receiving in different MAC protocol data units (MPDUs) of one aggregated MPDU (A-MPDU), generating an A-MPDU including a plurality of MPDUs, where at least a portion of the plurality of MPDUs include different A-Control fields based on the received capabilities information, and transmitting the A-MPDU packet to the second wireless device.

An apparatus for wireless communication is described. The apparatus may include a processor, memory in electronic communication with the processor, and instructions stored in the memory. The instructions may be executable by the processor to cause the apparatus to receive, by a first wireless station of a WLAN, a capabilities information field from a second wireless device of the WLAN, the capabilities information field indicating a number of different A-Control fields that a second wireless device is capable of receiving in different MPDUs of one A-MPDU, generate an A-MPDU including a plurality of MPDUs, where at least a portion of the plurality of MPDUs include different A-Control fields based on the received capabilities information, and transmit the A-MPDU packet to the second wireless device.

Another apparatus for wireless communication is described. The apparatus may include means for receiving, by a first wireless station of a WLAN, a capabilities information field from a second wireless device of the WLAN, the capabilities information field indicating a number of different aggregated control (A-Control) fields that a second wireless device is capable of receiving in different MPDUs of one A-MPDU, means for generating an A-MPDU including a plurality of MPDUs, where at least a portion of the plurality of MPDUs include different A-Control fields based on the received capabilities information, and means for transmitting the A-MPDU packet to the second wireless device.

A non-transitory computer-readable medium storing code for wireless communication is described. The code may include instructions executable by a processor to receive, by a first wireless station of a WLAN, a capabilities information field from a second wireless device of the WLAN, the capabilities information field indicating a number of different A-Control fields that a second wireless device is capable of receiving in different MPDUs of one A-MPDU, generate an A-MPDU including a plurality of MPDUs, where at least a portion of the plurality of MPDUs include different A-Control fields based on the received capabilities information, and transmit the A-MPDU packet to the second wireless device.

Some examples of the method, apparatuses, and non-transitory computer-readable medium described herein may further include operations, features, means, or instructions for buffering data associated with one or more TIDs for transmission to a second wireless station of the WLAN, where an HE A-Control field for each MPDU of the portion of the MPDUs includes different BSR control field values based on the buffering. Some examples of the method, apparatuses, and non-transitory computer-readable medium described herein may further include operations, features, means, or instructions for setting the different BSR control field values to indicate buffer status information for different TIDs of the one or more TIDs. In some examples of the method, apparatuses, and non-transitory computer-readable medium described herein, the different BSR control fields indicate buffer status information for TIDs associated with different ACs. Some examples of the method, apparatuses, and non-transitory computer-readable medium described herein may further include operations, features, means, or instructions for BSR control fields, OM control fields, HLA control fields, UPH control fields, BQR control fields, command control fields, status control fields, or a combination thereof.

A method of wireless communication is described. The method may include buffering, by a first wireless station of a WLAN, data associated with a TID or an AC for transmission to a second wireless station of the WLAN, generating a media access control MPDU comprising a BSR control field based at least in part on the buffering, the BSR control field comprising TID information or AC information, a first queue size parameter, and a second queue size parameter; where the TID information or AC information indicates a mapping of buffer status information for the TID or the AC to the first queue size parameter and the second queue size parameter, and the first queue size parameter and the second queue size parameter collectively correspond to a buffer status for the TID or the AC, and transmitting the MPDU to the second wireless station.

An apparatus for wireless communication is described. The apparatus may include a processor, memory in electronic communication with the processor, and instructions stored in the memory. The instructions may be executable by the processor to cause the apparatus to buffer, by a first wireless station of a WLAN, data associated with a TID or an AC for transmission to a second wireless station of the WLAN, generate a media access control MPDU comprising a BSR control field based at least in part on the buffering, the BSR control field comprising TID information or AC information, a first queue size parameter, and a second queue size parameter; where the TID information or AC information indicates a mapping of buffer status information for the TID or the AC to the first queue size parameter and the second queue size parameter, and the first queue size parameter and the second queue size parameter collectively correspond to a buffer status for the TID or the AC, and transmit the MPDU to the second wireless station.

Another apparatus for wireless communication is described. The apparatus may include means for buffering, by a first wireless station of a WLAN, data associated with a TID or an AC for transmission to a second wireless station of the WLAN, means for generating a MPDU comprising a BSR control field based at least in part on the buffering, the BSR control field comprising TID information or AC information, a first queue size parameter, and a second queue size parameter; where the TID information or AC information indicates a mapping of buffer status information for the TID or the AC to the first queue size parameter and the second queue size parameter, and the first queue size parameter and the second queue size parameter collectively correspond to a buffer status for the TID or the AC, and means for transmitting the MPDU to the second wireless station.

A non-transitory computer-readable medium storing code for wireless communication is described. The code may include instructions executable by a processor to buffer, by a first wireless station of a WLAN, data associated with a TID or an AC for transmission to a second wireless station of the WLAN, generate a media access control MPDU comprising a BSR control field based at least in part on the buffering, the BSR control field comprising TID information or AC information, a first queue size parameter, and a second queue size parameter; where the TID information or AC information indicates a mapping of buffer status information for the TID or the AC to the first queue size parameter and the second queue size parameter, and the first queue size parameter and the second queue size parameter collectively correspond to a buffer status for the TID or the AC, and transmit the MPDU to the second wireless station.

In some examples of the method, apparatuses, and non-transitory computer-readable medium described herein, generating the MPDU includes determining the buffer status based at least in part on the buffering and determining the first queue size parameter and the second queue size parameter, where a summation of the first queue size parameter and the second queue size parameter indicate the buffer status.

In some examples of the method, apparatuses, and non-transitory computer-readable medium described herein, the MPDU further includes a QoS control field, and generating the MPDU includes determining the buffer status based at least in part on the buffering and determining the first queue size parameter, the second queue size parameter, and a third queue size parameter corresponding to the QoS control field, where a summation of the first queue size parameter, the second queue size parameter, and the third queue size parameter indicate the buffer status.

DETAILED DESCRIPTION

Figure 1:
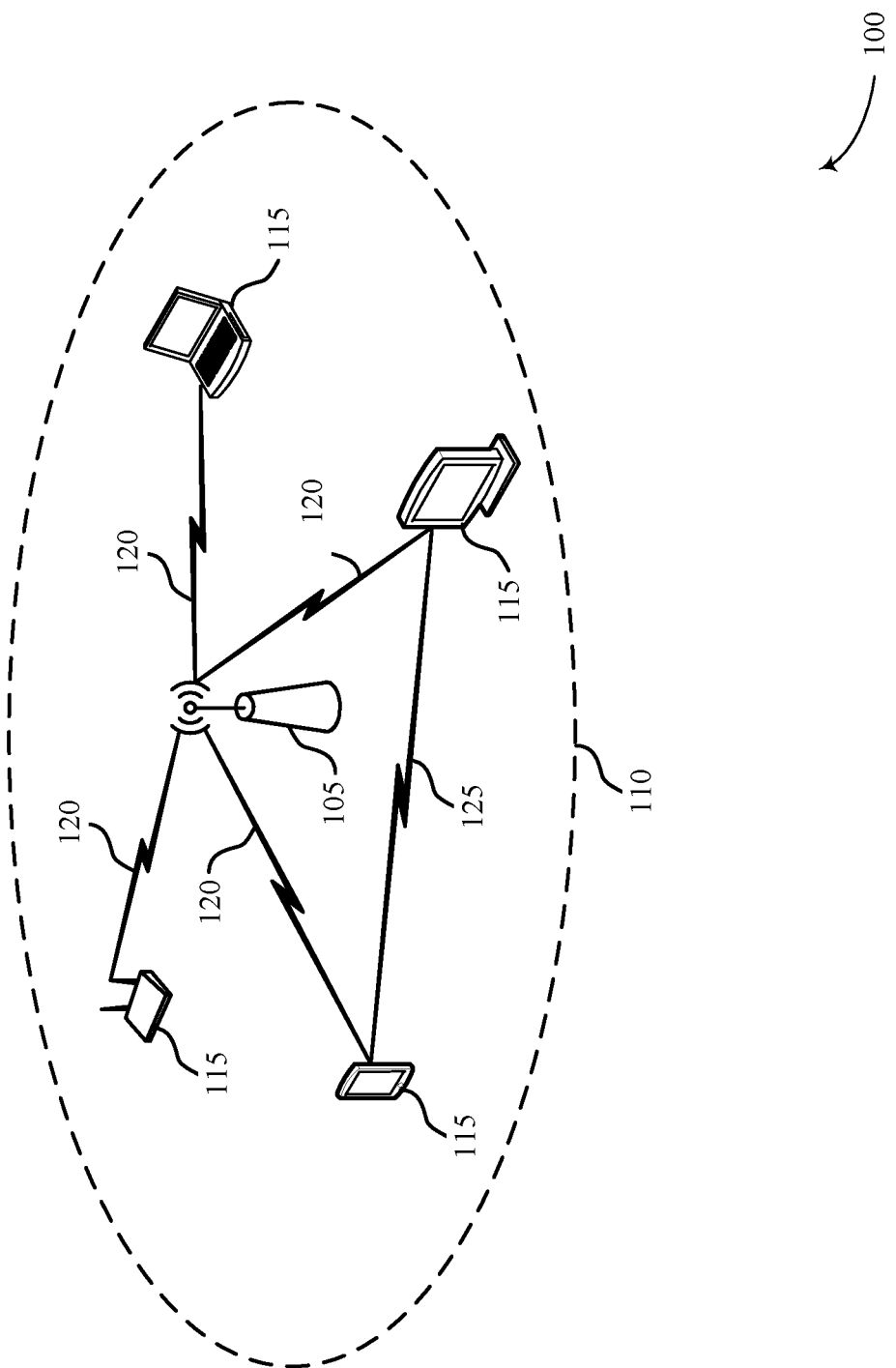
FIG. 1 illustrates an example of a wireless communications system that supports improved traffic identifier (TID) based buffer status reporting in accordance with aspects of the present disclosure.

In some wireless communication systems (e.g., wireless local area networks (WLANs)), wireless devices (e.g., stations (STAs), access points (APs), etc.) may communicate over a shared medium. For efficient allocation and use of communication resources, wireless devices may send at least one buffer status report (BSR) indicating how much data is queued in a buffer waiting to be transmitted (e.g., buffer status reporting may be used to indicate to a peer STA the amount of buffered data the STA has pending). For example, STAs may send BSRs to an AP, which may be used by the AP to allocate uplink transmission resources. The AP may use the BSR to decide which STA and which traffic identifier (TID) may be assigned uplink resources for uplink data transmission. A STA may send a BSR within a header of a packet transmitted to another wireless device (e.g., an AP), in response to an explicit AP request for a BSR, etc. For example, buffer status reporting may be performed using a quality of service (QoS) control field and/or a BSR control field in a header of a media access control (MAC) protocol data unit (MPDU).

In conventional techniques, a STA may inform an AP of the STA's buffer status using techniques that may be deficient because they fail to provide TID differentiation (e.g., a STA may not indicate amounts of buffered data on a per-TID basis) and may fail to convey queue sizes associated with relatively larger amounts of buffered data (e.g., a STA may have more data buffered than some maximum buffer size conveyable). For example, buffer status reporting performed using QoS control fields (e.g., in systems communicating according to the WLAN radio and baseband protocol for physical and MAC layers from IEEE 802.11 prior to IEEE 802.11ax) may be performed on a per TID basis (e.g., indicated by a TID subfield of the QoS control field). However, such QoS control field buffer status reporting may be associated with a maximum reportable buffer size (e.g., 2 Mbytes) and may not provide information about other TIDs corresponding to the buffered traffic (e.g., TIDs other than the TID associated with the QoS TID subfield). The STA may use one or more MPDUs (each of which contains a QoS control field) to deliver a buffer status to the receiving STA for all TIDs whose data traffic has been buffered. As another example, buffer status reporting performed using BSR control fields (e.g., in systems communicating according to the WLAN radio and baseband protocol for physical and MAC layers from IEEE 802.11ax) may be associated with a maximum reportable buffer size (e.g., the maximum reportable buffer size may be 8 Mbytes) and may be performed on a per Access Category (AC) or all AC basis (e.g., BSR may be reported for a single AC, which may each be associated with two TIDs, or may be cumulatively reported for all ACs). BSR control fields may provide cumulative (e.g., collective) information for different ACs, identify the AC deemed highest priority from the STA's perspective, and provide information about how many TIDs have traffic, but still may not clearly identify the TIDs for which buffer status information is being reported (e.g., as each AC may be associated with two TIDs, and the BSR control field buffer status reporting may be only on a per-AC basis).

As such, conventional techniques may be lacking in terms of providing options or techniques for reporting per-TID buffer status information, and may further be associated with undesirable upper bounds on how much buffer status information may be reported (e.g., up to 8 Mbytes per AC). The techniques described below may allow for buffer status reporting on a per-TID basis, and further may allow for reporting of an increased range of buffer sizes (e.g., up to 18 Mbytes per TID). Additionally or alternatively, a peer STA (e.g., an AP) may more efficiently handle (e.g., allocate resources for) prioritized communications (e.g., buffers associated with prioritized TIDs) and may more accurately determine the size of larger buffer sizes that exceed conventional BSR capabilities.

TID-specific BSRs may convey increased buffer sizes. A BSR control field may include an Access Category Identifier (ACI) bitmap, a delta TID parameter (e.g., corresponding to a Delta TID subfield), a first queue size parameter (e.g., corresponding to a Queue Size High subfield), and a second queue size parameter (e.g., corresponding to a Queue Size All subfield). The ACI bitmap and the delta TID parameter may indicate a mapping of buffer status information for one or more TIDs to the first queue size subfield and the second queue size subfield, thus providing for TID-specific buffer status reporting. For example, in cases where the ACI bitmap indicates a single AC (e.g., versus two or more ACs) the delta TID parameter may indicate a mapping between the higher TID and the lower TID (e.g., associated with the single AC) and the two queue sizes (e.g., the Queue Size High subfield and the Queue Size All subfield). In some examples, the delta TID parameter (e.g., the Delta TID subfield) may be represented by two bits within the BSR control field, and may thus take four values. The delta TID parameter may therefore be set to indicate that (1) the Queue Size High and Queue Size All fields collectively indicate a buffer status for the lower TID of the AC indicated by the ACI bitmap; (2) the queue size high field indicates a buffer status for a lower TID of the ACI-indicated AC and the queue size all field indicates a buffer status for a higher TID of the ACI-indicated AC; (3) the queue size high field indicates a buffer status for a higher TID of the ACI-indicated AC and the queue size all field indicates a buffer status for a lower TID of the ACI-indicated AC; and (4) the queue size high and queue size all fields collectively indicate a buffer status for the higher TID of the AC indicated by the ACI bitmap.

In some cases, the ACI bitmap and the delta TID parameter may collectively indicate one or more values of TID(s) associated with the BSR control field. For example, bits of the ACI Bitmap subfield and bits of a Delta TID subfield (e.g., or bits of a new TID Indication subfield) may collectively indicate one or more 3-bit values corresponding to TIDs (e.g., TID0 through TID7). As another example, MPDUs may be generated with BSR control fields that include TID bitmaps (e.g., a new TID Bitmap subfield, or a TID bitmap) which may explicitly indicate one or more TIDs associated with the BSR control field. A TID bitmap may include 8 bits, and each bit location may correspond to one of 8 TIDs (e.g., TID0 through TID7). A value of the TID bitmap may thus indicate one or more TID(s) associated with the BSR control field based on the locations of bits (e.g., within the TID bitmap) that are set to 1.

In some cases, the range of conveyable buffer sizes may be further refined with the use of QoS control fields. An MPDU header may include both a BSR control field and a QoS control field. The TID subfield of the QoS control field may be reconciled with the delta TID parameter of the BSR control filed for increased flexibility in BSR queue size reporting. That is, QoS buffer queue size, queue size high, and queue size all may be accumulated in different combinations based on which TID is associated with the respective queues (e.g., as indicated by the QoS TID subfield and the delta TID parameter). Therefore, MPDUs may be generated to convey TID-specific BSRs with 2 Mbytes (e.g., with only a QoS buffer size field), 8 Mbytes (e.g., with only either a queue size high field or queue size all field), 10 Mbytes (e.g., with QoS buffer size field and either queue size high field or queue size all field), 16 Mbytes (e.g., with both queue size high field and queue size all field), and 18 Mbytes (e.g., with QoS buffer size field, queue size high field, and queue size all field). That is, the proposed enhancements to TID based buffer status reporting may enable signaling of 18 Mbytes per TID.

Additionally or alternatively, techniques discussed herein may provide for more flexible control signaling within aggregate MPDUs (A-MPDUs). A-MPDUs may include several MPDUs, each of which conventionally may be associated with a similar aggregated control (A-Control) field. As such, control information, such as BSR, may be limited to one instance per A-MPDU, which may result in undesirable overhead associated with conveying large amounts of buffer status information. As discussed in more detail below, a STA may indicate (e.g., via a capabilities information field) support of different A-Control fields supported by the STA. For example, a STA may indicate a number of different A-Control field formats the STA is capable of receiving in different MPDUs of one A-MPDU. In some cases, a STA may receive such a capabilities information field from a peer STA, and may generate an A-MPDU that includes MPDUs with different A-Control fields (e.g., compared to conventional techniques where A-MPDU generation may be associated with A-control field restrictions). As such, increased and diverse control information (e.g., A-Control fields including information such as BSR control fields, Operating mode (OM) control fields, high efficiency (HE) link adaptation (HLA) control fields, uplink power headroom (UPH) control fields, bandwidth query report (BQR) control fields, etc.) may be conveyed in a single A-MPDU (e.g., up to a receiving STA's capability).

Aspects of the disclosure are initially described in the context of a wireless communications system. Example process flows, capabilities elements, and control information subfields that support improved TID based buffer status reporting are then described. Aspects of the disclosure are further illustrated by and described with reference to apparatus diagrams, system diagrams, and flowcharts that relate to improved TID based buffer status reporting.

FIG. 1 illustrates a wireless local area network (WLAN) 100 (also known as a Wi-Fi network) configured in accordance with various aspects of the present disclosure. The WLAN 100 may include an AP 105 and multiple associated STAs 115, which may represent devices such as mobile stations, personal digital assistant (PDAs), other handheld devices, netbooks, notebook computers, tablet computers, laptops, display devices (e.g., TVs, computer monitors, etc.), printers, etc. The AP 105 and the associated STAs 115 may represent a basic service set (BSS) or an extended service set (ESS). The various STAs 115 in the network are able to communicate with one another through the AP 105. Also shown is a coverage area 110 of the AP 105, which may represent a basic service area (BSA) of the WLAN 100. An extended network station (not shown) associated with the WLAN 100 may be connected to a wired or wireless distribution system that may allow multiple APs 105 to be connected in an ESS.

Although not shown in FIG. 1, a STA 115 may be located in the intersection of more than one coverage area 110 and may associate with more than one AP 105. A single AP 105 and an associated set of STAs 115 may be referred to as a BSS. An ESS is a set of connected BSSs. A distribution system (not shown) may be used to connect APs 105 in an ESS. In some cases, the coverage area 110 of an AP 105 may be divided into sectors (also not shown). The WLAN 100 may include APs 105 of different types (e.g., metropolitan area, home network, etc.), with varying and overlapping coverage areas 110. Two STAs 115 may also communicate directly via a direct wireless link 125 regardless of whether both STAs 115 are in the same coverage area 110. Examples of direct wireless links 120 may include Wi-Fi Direct connections, Wi-Fi Tunneled Direct Link Setup (TDLS) links, and other group connections. STAs 115 and APs 105 may communicate according to the WLAN radio and baseband protocol for physical and MAC layers from IEEE 802.11 and versions including, but not limited to, 802.11b, 802.11g, 802.11a, 802.11n, 802.11ac, 802.11ad, 802.11ah, 802.11ax, etc. In other implementations, peer-to-peer connections or ad hoc networks may be implemented within WLAN 100. In some cases, devices in WLAN 100 may communicate over unlicensed spectrum, which may be a portion of spectrum that includes frequency bands traditionally used by Wi-Fi technology, such as the 5 GHz band, the 2.4 GHz band, the 60 GHz band, the 3.6 GHz band, and/or the 900 MHz band. The unlicensed spectrum may also include other frequency bands.

In some cases, a STA 115 (or an AP 105) may be detectable by a central AP 105, but not by other STAs 115 in the coverage area 110 of the central AP 105. For example, one STA 115 may be at one end of the coverage area 110 of the central AP 105 while another STA 115 may be at the other end. Thus, both STAs 115 may communicate with the AP 105, but may not receive the transmissions of the other. This may result in colliding transmissions for the two STAs 115 in a contention based environment (e.g., CSMA/CA) because the STAs 115 may not refrain from transmitting on top of each other. A STA 115 whose transmissions are not identifiable, but that is within the same coverage area 110 may be known as a hidden node. CSMA/CA may be supplemented by the exchange of a request-to-send (RTS) packet transmitted by a sending STA 115 (or AP 105) and a clear-to-send (CTS) packet transmitted by the receiving STA 115 (or AP 105). This may alert other devices within range of the sender and receiver not to transmit for the duration of the primary transmission. Thus, RTS/CTS may help mitigate a hidden node problem.

The examples described herein provide an improved mechanism for improved TID based buffer status reporting. A STA 115 may buffer data (e.g., which may be associated with one or more TIDs) for transmission to a second wireless station (e.g., a second STA 115, an AP 105, etc.). An MPDU header of an MPDU may include a BSR control field, a QoS control field, or both. BSR control fields may be generated to differentiate for which TID buffer status reporting is being signaled and may, in some cases, be combined with QoS control fields for TID-specific and buffer size flexible buffer status reporting. Further a STA 115 may generate A-MPDUs that include MPDUs with different control information (e.g., MPDUs with different control field types or Type subfields of the Frame Control field) based on a receiving wireless stations capability (e.g., for increased control signaling flexibility within an A-MPDU).

Figure 2:
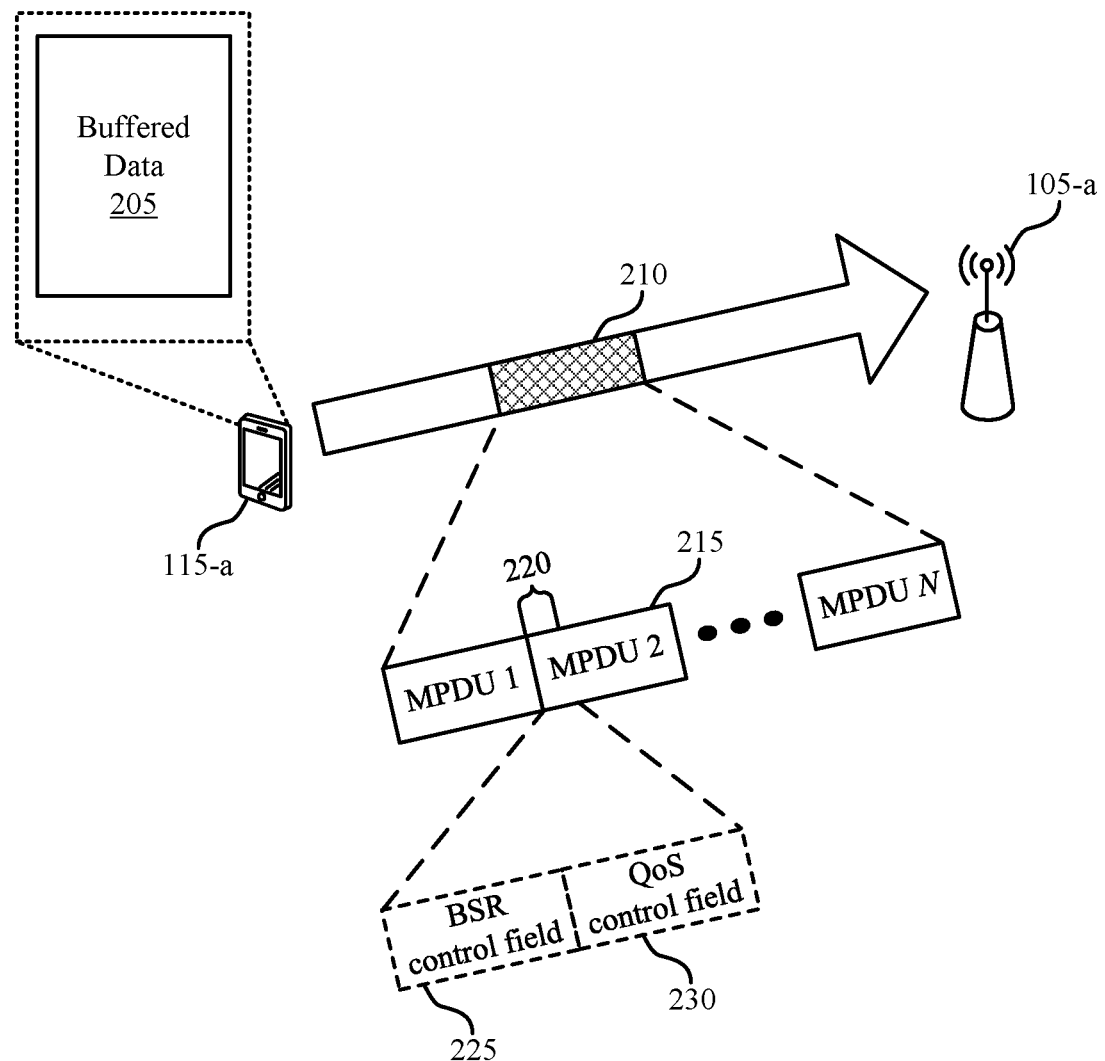
FIG. 2 illustrates an example of a wireless local area network (WLAN) that supports improved TID based buffer status reporting in accordance with aspects of the present disclosure.

FIG. 2 illustrates an example of a WLAN 200 that supports improved TID based buffer status reporting in accordance with aspects of the present disclosure. In some examples, WLAN 200 may implement aspects of WLAN 100. For example, WLAN 200 may include a STA 115-*a* and an AP 105-*a* (which may also be a STA 115), which may be examples of STAs 115 and APs 105 as described with reference to FIG. 1. In the present example, STA 115-*a* may generate A-MPDUs 210 that may include multiple MPDUs 215 for communications with other wireless stations. Alternatively, MPDUs 215 may be sent on an individual basis. STA 115-*a* may generate A-MPDUs 210 and/or MPDUs 215 according to the disclosed techniques for improved TID based buffer status reporting. It should be appreciated that the buffer status reporting techniques discussed are illustrated for exemplary purposes, and may be applied to STA 115 to STA 115 communications, AP 105 to AP 105 communications, etc. by analogy, without departing from the scope of the present disclosure.

STA 115-*a* may buffer data 205 (e.g., associated with one or more TIDs) for transmission to a second wireless station (e.g., AP 105-*a*). STA 115-*a* may generate an A-MPDU 210 consisting of one or more MPDUs 215 containing BSR information for the buffer data 205 and may transmit the A-MPDU 210 to AP 105-*a*. An MPDU header 220 of an MPDU 215 of the A-MPDU 210 may include a BSR control field 225, a QoS control field 230, or both. BSR control fields 225 may be generated to differentiate for which TID buffer status reporting is being signaled. For example, a BSR control field 225 may include at least an ACI bitmap, a delta TID parameter, a first queue size parameter (e.g., a queue size high field), and a second queue size parameter (e.g., a queue size all field). When the ACI bitmap indicates a single AC (e.g., when the ACI bitmap has only one bit set to a nonzero value), the number of TIDs associable with the buffer status information may be reduced to the number of TIDs associated with the single AC. As such, the delta TID parameter may be used to identify a mapping between the higher TID and lower TID associated with the AC indicated by the ACI bitmap, and the two queue sizes indicated by BSR control field 225. If the STA 115-*a* sets only one bit to non-zero in the ACI Bitmap subfield, STA 115-*a* may report the buffer status for the lower TID (e.g., when the delta TID parameter or Delta TID subfield is set to 0) or for the higher TID (e.g., when Delta TID subfield is set to 2) or both (e.g., when Delta TID subfield is set to 1 or 3) TIDs of that AC.

Examples of such queue to TID mapping is discussed in more detail below with reference to FIG. 3.

In cases where a QoS control field 230 is included in the MPDU 215 (e.g., in the MPDU header 220), queue sizes of the BSR control field 225 (e.g., queue size high field and queue size all field) and the QoS control field 230 (e.g., QoS buffer size field) may be accumulated in different combinations for increased reportable ranges of buffer sizes. That is, QoS buffer queue size, queue size high, and queue size all may be accumulated in different combinations based on which TID is associated with the respective queues (e.g., as indicated by the QoS TID subfield and the delta TID parameter). Therefore, MPDUs may be generated to convey TID-specific BSRs with 2 Mbytes (e.g., with only a QoS buffer size field), 8 Mbytes (e.g., with only either a queue size high field or queue size all field), 10 Mbytes (e.g., with QoS buffer size field and either queue size high field or queue size all field), 16 Mbytes (e.g., with both queue size high field and queue size all field), or 18 Mbytes (e.g., with QoS buffer size field, queue size high field, and queue size all field). As an example, if STA 115-a reports a valid buffer status for a given TID (e.g., a Queue Size field is less than 254) in more than one Queue Size of the MPDU 215, then the buffer status for that TID may be the sum of the buffer status reported in each of the Queue Sizes. STA 115-a may report up to 2,147,328 octets in the QoS Control field 230, and up to 8,323,072 octets in each of the Queue Size High and Queue Size All fields of the BSR Control field 225. As such STA 115-a may, for example, report up to 18,793,472 octets for a given TID by transmitting an MPDU 215 with a Queue Size field that is less than 253 and a BSR Control field 225 that has the bit corresponding to the AC of that TID set to 1 and the Delta TID set to 0 or 2 (e.g., depending on whether the TID is the lower or higher TID of that AC). STA 115-a may report in an A-MPDU 210 with multiple such BSR for all TIDs (e.g., provided that the AP 105-a supports reception of up to 8 HE A-Control fields).

Additionally or alternatively, a receiving STA 115 (e.g., a second wireless station, AP 105-a, etc.) may indicate a control field capability (e.g., a number of supported HE variant high throughput (HT) control fields), such that a transmitting STA 115 (e.g., STA 115-a) may transmit different control content in a same A-MPDU 210. That is, STA 115-a may generate an A-MPDU 210 that includes MPDUs 215 with different control fields (e.g., BSR control fields 225, QoS control fields 230, OM control fields, HLA control fields, UPH control fields, BQR control fields, command control fields, status control fields, etc.) for more flexible control signaling within A-MPDUs 210, which may result in reduced control signaling overhead. STA 115-a may deliver BSR for different ACs (e.g., up to 4) and for different TIDs (e.g., up to 8) by including multiple BSR Control fields 225 in the MPDUs 215 of the A-MPDU 210. Each BSR Control field 225 may provide BSR for a particular AC/TID. Since the contents of the BSR Control fields 225 may be allowed to be different (e.g., across different MPDUs 215 of the A-MPDU 210), the receiving STA 115 (e.g., AP 105-a) may determine the BSR for each AC/TIDs at the transmitting STA 115-a with both QoS Control fields 230 and BSR control fields 225.

As an example, if an HT Control field is present in an MPDU 215 aggregated in an A-MPDU 210, then all MPDUs 215 of the same frame type (e.g., those having the same value for the Type subfield of the Frame Control field) aggregated in the same A-MPDU 210 may contain an HT Control field. The HT Control field of all MPDUs 215 containing the HT Control field aggregated in the same A-MPDU 210 may be set to the same value (e.g., all control fields may be the same across MPDUs 215 of the A-MPDU 210). Alternatively, as discussed above, the receiving STA 115 may indicate support for receiving multiple control fields (e.g., indicate support for receiving multiple HE variant HT Control fields by setting a Rx Maximum A-Control Fields in A-MPDU Supported field of the HE Capabilities element to a nonzero value). In such an example, the number of HE variant HT Control fields in MPDUs 215 aggregated in the same A-MPDU 210 that have different values may not exceed the value of the Maximum A-Control Fields In A-MPDU Supported field of the HE Capabilities element transmitted by the recipient of the A-MPDU 210 (e.g., AP 105-a). Examples of such control field support indication via capability information fields are discussed in more detail below with reference to FIG. 4.

Figure 3A:
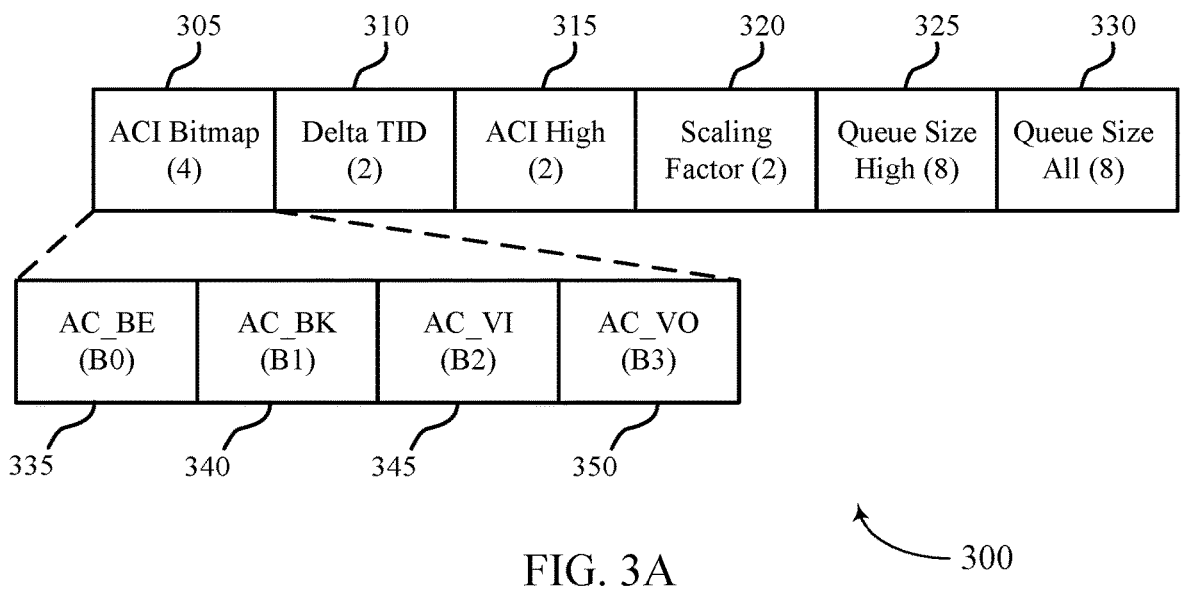
FIGS. 3A, 3B, and 3C illustrate examples of control information subfields that support improved TID based buffer status reporting in accordance with aspects of the present disclosure.

FIG. 3A illustrates an example of a control information subfield 300 (e.g., a BSR control field) for improved TID based buffer status reporting. In some examples, control information subfield 300 may implement aspects of WLAN 100 and WLAN 200. For example, STAs 115 and/or APs 105, which may be examples of the corresponding devices as described with reference to FIGS. 1 and 2, may include control information subfields 300 in MPDUs according to TID based buffer status reporting techniques discussed herein.

Control Information Subfield 300 may include buffer status information (e.g., for uplink multi-user (MU) operation) in accordance with various aspects of the present disclosure. For example, control information subfield 300 may illustrate a control information subfield format when a Control ID subfield is set to 3. Control Information Subfield 300 may include ACI Bitmap subfield 305, Delta TID subfield 310, ACI High subfield 315, Scaling Factor subfield 320, Queue Size High subfield 325, and Queue Size All subfield 330. Further, the Control Information Subfield 300 may include, for example, 26 bits divided over the subfields 305-330. An example of such a division may be 4 bits for ACI Bitmap Subfield 305, 2 bits for Delta TID subfield 310, 2 bits for ACI High subfield 315, 2 bits for Scaling Factor subfield 320, 8 bits for Queue Size High subfield 325, and 8 bits for Queue Size All subfield 330 (e.g., as shown in parentheses). The techniques discussed herein may be applicable to different orders and sizes of subfields within a control information subfield by analogy, without departing from the scope of the present disclosure.

An ACI Bitmap subfield 305 may indicate the ACs for which the buffer status is reported. ACI Bitmap subfield 305 may include 4 bits: bit AC_BE 335 (e.g., indicating buffered AC best effort traffic), bit AC_BK 340 (e.g., indicating buffered AC background traffic), bit AC_VI 345 (e.g., indicating buffered AC video traffic), and bit AC_VO 350 (e.g., indicating buffered AC voice traffic). Each bit of the ACI Bitmap subfield 305 may be set to 1 to indicate the corresponding AC for which the buffer status is reported, and may be set to 0 otherwise. The ACI Bitmap subfield 305 may indicate the ACs for which the buffer status is reported. Encoding of an example ACI Bitmap subfield 305 is shown in Table 3.1. For example, Table 3.1 may illustrate bits of ACI bitmap that may be set to indicate the above ACs.

TABLE 3.1

| B0 | B1 | B2 | B3 |
|---|---|---|---|
| AC_BE | AC_BK | AC_VI | AC_VO |

A value of 1 for any of bits B0, B1, B2, and B3 may therefore indicate the corresponding AC is associated with the Queue Size High subfield 325 and the Queue Size All subfield 330 in some capacity, as described in more detail below (e.g., with reference to Table 3.2). Each bit of the ACI Bitmap subfield 305 is set to 1 to indicate the corresponding AC/TID for which the buffer status is reported and set to 0 otherwise. When the ACI Bitmap subfield 305 is 0 and the Delta TID subfield 310 is 3, the ACI Bitmap subfield 305 may be indicating that there is buffered traffic for all 8 TIDs (see Table 3.2)). The Delta TID subfield 310, together with the values of the ACI Bitmap subfield 305, may indicate the number of TIDs and, in certain cases, the TID for which the STA is reporting the buffer status. The encoding of the Delta TID subfield 310 may be defined in Table 3.2.

A Delta TID subfield 310, when taken together with the values of the ACI Bitmap subfield 305, may indicate the number of TIDs and, in some cases, the TID for which the STA 115 is reporting the buffer status (e.g., the mapping of the indicated TID(s) and the Queue Size High subfield 325 and Queue Size All subfield 330). For example, Table 3.2 may illustrate a mapping of TID based BSR to the Queue Size High subfield 325 and the Queue Size All subfield 330.

for the higher TID of the AC indicated by the ACI High subfield 315. If the Delta TID subfield 310 has a value of 3, the Queue Size High subfield 325 may indicate the buffer status for the higher TID of the AC indicated by the ACI High subfield 315 and the Queue Size All subfield 330 may indicate the buffer status for the lower TID of the AC indicated by the ACI High subfield 315.

If exactly two bits of the ACI Bitmap subfield 305 are set to 1, then a value 0 of the Delta TID subfield 310 may indicate buffered traffic for 2 TIDs, a value 1 may indicate buffered traffic for 3 TIDs, and a value 2 may indicate buffered traffic for 4 TIDs. If the Delta TID subfield 310 is 3, the Queue Size High subfield 325 may indicate a higher TID amongst the higher TID of the two TIDs corresponding to the AC indicated by the ACI High subfield 315 and Queue Size All subfield 330 may indicate the sum of the lower and higher TID corresponding to AC indicated the ACI High subfield 315.

If exactly three bits of the ACI Bitmap subfield 305 are set to 1, then a value 0 of the Delta TID subfield 310 may indicate buffered traffic for 3 TIDs, a value 1 may indicate buffered traffic for 4 TIDs, a value 2 may indicate buffered traffic for 5 TIDs, and a value 3 may indicated buffered traffic for 6 TIDs.

TABLE 3.2

| Number of Bits Set to '1' in ACI Bitmap Subfield | Mapping of Delta TID subfield value and number of TIDs, $N_{TID}$ |
|---|---|
| 0 | Values 0 to 2 are not applicable; Value 3 indicates 8 TIDs (i.e., all ACs have traffic) |
| 1 | Value 0 indicates 1 TID; Value 1 indicates 2 TIDs; If Delta TID is 0 then Queue Size High and Queue Size All fields indicate the cumulative (e.g., collective) buffer status for the lower TID of that AC If Delta TID is 1 then Queue Size High indicate the buffer status for the lower TID of that AC and Queue Size All indicates the buffer status for the higher TID of that AC Value 2 indicates 1 TID; Value 3 indicates 2 TIDs; If Delta TID is 2 then Queue Size High and Queue Size All fields indicate the cumulative buffer status for the higher TID of that AC If Delta TID is 3 then Queue Size High indicates the buffer status for the higher TID of that AC and Queue Size All indicates the buffer status for the lower TID of that AC |
| 2 | Value 0 indicates 2 TID; Value 1 indicates 3 TIDs; Value 2 indicates 4 TIDs; If Delta TID is 3, then the Queue Size High indicates the higher TID amongst the 2 TID for the ACI represented by the ACI High subfield and Queue Size All indicates the sum of lower and higher TID corresponding to the ACI High subfield. |
| 3 | Value 0 indicates 3 TID; Value 1 indicates 4 TIDs; Value 2 indicates 5 TIDs; Value 3 indicates 6 TIDs; |
| 4 | Value 0 indicates 4 TID; Value 1 indicates 5 TIDs; Value 2 indicates 6 TIDs; Value 3 indicates 7 TIDs; |

If only one bit of ACI Bitmap subfield 305 is set to 1, then a value of 0 or 2 by the Delta TID subfield 310 may indicate there is buffered traffic for 1 TID, while a value of 1 or 3 may indicate buffered traffic for 2 TIDs. Moreover, a value of 0 by the Delta TID subfield 310 may mean that the Queue Size High subfield 325 and the Queue Size All subfield 330 indicate the cumulative buffer status for the lower TID of the AC indicated by the ACI High subfield 315. Meanwhile, a value of 1 by the Delta TID subfield 310, indicating two TIDs, may mean that the Queue Size High subfield 325 may indicate the buffer status for the lower TID of the AC indicated by the ACI High subfield 315 and the Queue Size All subfield 330 may indicate the buffer status for the lower TID of the AC indicated by the ACI High subfield 315. If the Delta TID subfield 310 has a value of 2 (e.g., indicating one TID) the Queue Size High subfield 325 and the Queue Size All subfield 330 may indicate the cumulative buffer status If all four bits of the ACI Bitmap subfield 305 are set to 1, then a value 0 of the Delta TID subfield 310 may indicate buffered traffic for 4 TIDs, a value 1 may indicate buffered traffic for 5 TIDs, a value 2 may indicate buffered traffic for 6 TIDs, and a value 3 may indicate buffered traffic for 7 TIDs.

An ACI High subfield 315 may indicate the ACI of the AC for which the BSR is indicated in the Queue Size High subfield 325. Such an ACI to AC mapping may be indicated by a table. The ACI High subfield 315 may, in some cases, indicate an AC other than an AC configured as the higher priority AC is associated with the Queue Size High subfield 325. For example, the ACI High subfield 315 may indicate that buffered AC background traffic is associated with the Queue Size High subfield 325 even in the presence of AC voice traffic (e.g., if background traffic has been stalled for an extended period of time).

A Scaling Factor subfield 320 may indicate the unit (e.g., in terms of number of octets) indicated by the Queue Size High subfield 325 and the Queue Size All subfield 330. As shown in Table 3.3, an example of such an encoding may be a scaling factor of 16 octets for the Scaling Factor subfield 320 value of 0, 256 octets for a value of 1, 2048 octets for a value of 2, and 32768 octets for a value of 3.

TABLE 3.3

| Scaling Factor Subfield | Scaling Factor, SF, in octets |
| --- | --- |
| 0 | 16 |
| 1 | 256 |
| 2 | 2048 |
| 3 | 32768 |

In some examples, the Scaling Factor subfield 320 may be repurposed as an extension of the Queue Size High subfield 325 or the Queue Size All subfield 330 (e.g., the Queue Size High subfield 325 or the Queue Size All subfield 330 may convey 10 Mbytes instead of 8 Mbytes). As such, MPDUs may be generated to convey TID-specific BSRs with 20 Mbytes (e.g., with QoS buffer size field, queue size high field, queue size all field, and the Scaling Factor subfield 320).

In scenarios where the ACI Bitmap subfield 305 indicates a single AC, the ACI High subfield 315 may, without repurposing, include redundant or unnecessary information (e.g., if only a single AC is indicated, the ACI High subfield 315 indicating the highest AC may be unnecessary). Therefore, in such cases, the ACI High subfield 315 may be repurposed as a second Scaling Factor subfield. For example, when the ACI Bitmap subfield 305 indicates a single AC, the ACI High subfield 315 may indicate a scaling factor for the Queue Size High subfield 325 and the original Scaling Factor subfield 320 may indicate a scaling factor for the Queue Size All subfield 330 (or vice versa). Alternatively, the ACI High subfield 315 and the Scaling Factor subfield 320 may be combined to indicate a 4-bit scaling factor for both the Queue Size High subfield 325 and the Queue Size All subfield 330. As such, when the ACI Bitmap subfield 305 indicates a single AC, the ACI High subfield 315 may be repurposed for increased scaling factor ranges (e.g., increased granularity of possible scaling factors), or increased flexibility in independent scaling factor configuration for the Queue Size High subfield 325 and the Queue Size All subfield 330.

A Queue Size High subfield 325 may indicate the amount of buffered traffic, in terms of the unit identified by the Scaling Factor subfield 320, for the AC identified by the ACI High subfield 315 and intended for the STA 115 identified by the receive address of the frame containing the BSR control field. When the ACI Bitmap subfield 305 has only one non-zero bit, the Queue Size High subfield 325 may indicate the amount of buffered traffic for the lower TID of that AC (e.g. if the Delta TID subfield 310 has a value of 0 or 1) or the Queue Size High subfield 325 may indicate the amount of buffered traffic for the higher TID of that AC (e.g. if the Delta TID subfield 310 has a value of 2 or 3). Alternatively, if the ACI Bitmap subfield 305 has two non-zero bits, then the Queue Size High subfield 325 may indicate buffered traffic for the higher TID amongst the 2 TIDs for the ACI represented by the ACI High subfield 315.

A Queue Size All subfield 330 may indicate the amount of buffered traffic, in terms of the unit identified by the Scaling Factor subfield 320, for all ACs identified by the ACI Bitmap subfield 305 and intended for the STA 115 identified by the receive address of the frame containing the BSR Control Field. When the ACI Bitmap subfield 305 has only one non-zero bit, the Queue Size All subfield 330 may indicate the amount of buffered traffic for the lower TID of that AC (e.g. if the Delta TID subfield 310 has a value of 1 or 3) or Queue Size All subfield 330 may indicate that amount of buffered traffic for the higher TID of the AC (e.g. if the Delta TID subfield 310 has a value of 0 or 2). Alternatively, if the ACI Bitmap subfield 305 has two non-zero bits, the Queue Size All subfield 330 may indicate the amount of buffered traffic corresponding to the 2 TIDs for the ACI represented by the ACI High subfield 315.

The queue size values in the Queue Size High subfield 325 and the Queue Size All subfield 330 may be the total sizes, rounded up to the nearest multiple of the octets per unit designated by the Scaling Factor subfield 320, of all MAC service data units (MSDUs) and aggregated MSDUs (A-MSDUs) buffered at the STA 115 (e.g. the MSDUs and A-MSDUs contained in the A-MPDU or MPDU containing the BSR) in the delivery queues used for MSDUs and A-MSDUs with AC(s) specified in the ACI High subfield 315 and the TID(s) specified in the ACI Bitmap subfield 305. A queue size value of 254 may be used for all sizes greater than 254 multiplied by the number of octets per unit specified by Scaling Factor subfield 320. A queue size of 255 may be used to indicate an unspecified or unknown size. If an MSDU or A-MSDU is fragmented and not carried in an A-MPDU, the queue size value may remain constant in all fragments, even if the amount of queued traffic changes as successive fragments may be transmitted. If an MSDU or A-MSDU is fragmented and is carried in an A-MPDU, the queue values may be set according to a number of rules. One such rule may be that when an A-MPDU contains multiple QoS Control fields, bit 4 shall not be identical across all MPDUs that contain the QoS Control Fields and bits 8-15 of these QoS Control fields shall be identical across all MPDUs with equal value of the delta TID subfield 310.

Figure 3B:
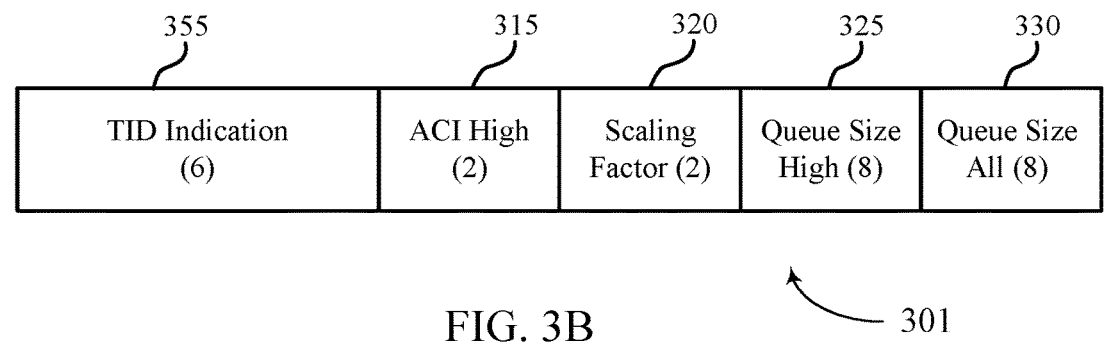

FIG. 3B illustrates an example of a control information subfield 301 (e.g., a BSR control field) for improved TID based buffer status reporting. In some examples, control information subfield 301 may implement aspects of WLAN 100 and WLAN 200. For example, STAs 115 and/or APs 105, which may be examples of the corresponding devices as described with reference to FIGS. 1 and 2, may include control information subfields 301 in MPDUs according to TID based buffer status reporting techniques discussed herein.

Control Information Subfield 301 may include buffer status information (e.g., for uplink multi-user (MU) operation) in accordance with various aspects of the present disclosure. Control Information Subfield 301 may include TID Indication subfield 355, ACI High subfield 315, Scaling Factor subfield 320, Queue Size High subfield 325, and Queue Size All subfield 330. Further, the Control Information Subfield 301 may include, for example, 26 bits divided over the subfields as shown in parentheses. Specifically, control information subfield 301 may differ from control information subfield 300 in that control information subfield 301 may include TID Indication subfield 355 in place of the ACI bitmap subfield 305 and the Delta TID subfield 310 included in control information subfield 300.

A TID Indication subfield 355 may explicitly indicate, for example, one or two TIDs. For example, for four ACs (e.g., each associated with two, a high and a low, TIDs) may result in a total of 8 TIDs. As such, 3 bits may be set to a value (e.g., 0-7) to indicate TID0, TID1, TID2 . . . TID7. For example, '000' may indicate TID0, '010' may indicate TID2, etc. In some cases, the TID Indication subfield 355 may include 6 bits (e.g., the ACI Bitmap subfield 305 and the Delta TID subfield 310 merged) to indicate two TIDs. In other cases, TID Indication subfield 355 may include 3 bits (e.g., 3 bits of ACI Bitmap subfield 305) to indicate a single TID, in which case the remaining bit of the ACI Bitmap subfield 305 and Delta TID subfield 310 may still be maintained or repurposed for other causes. In cases where the TID Indication subfield 355 indicates a single TID (e.g., 3 bits of ACI Bitmap subfield 305), the Queue Size High subfield 325 and the Queue Size All subfield 330 may collectively (e.g., with 16 Mbytes) indicate a buffer associated with the TID and the remaining bits may be repurposed for carrying some other information. In cases where the TID Indication subfield 355 indicates two TIDs, the Queue Size High subfield 325 may indicate a buffer associated with the first TID indicated by the TID Indication subfield 355 and the Queue Size All subfield 330 may indicate a buffer associated with the second TID indicated by the TID Indication subfield 355. Alternatively, when the TID Indication subfield 355 indicates two TIDs, the Queue Size High subfield 325 may indicate a buffer associated with the highest TID indicated by the TID Indication subfield 355 and the Queue Size All subfield 330 may indicate a buffer associated with all TIDs (e.g., both TIDs) indicated by the TID Indication subfield 355. In some cases (e.g., when the TID Indication subfield 355 indicates two TIDs) the ACI High subfield 315 may be repurposed as a TID High subfield, and may indicate which TID of the two indicated TIDs is associated with the Queue Size High subfield 325, and the Queue Size All subfield 330 may indicate buffer status information for both the TIDs indicated by the TID Indication subfield 355.

Figure 3C:
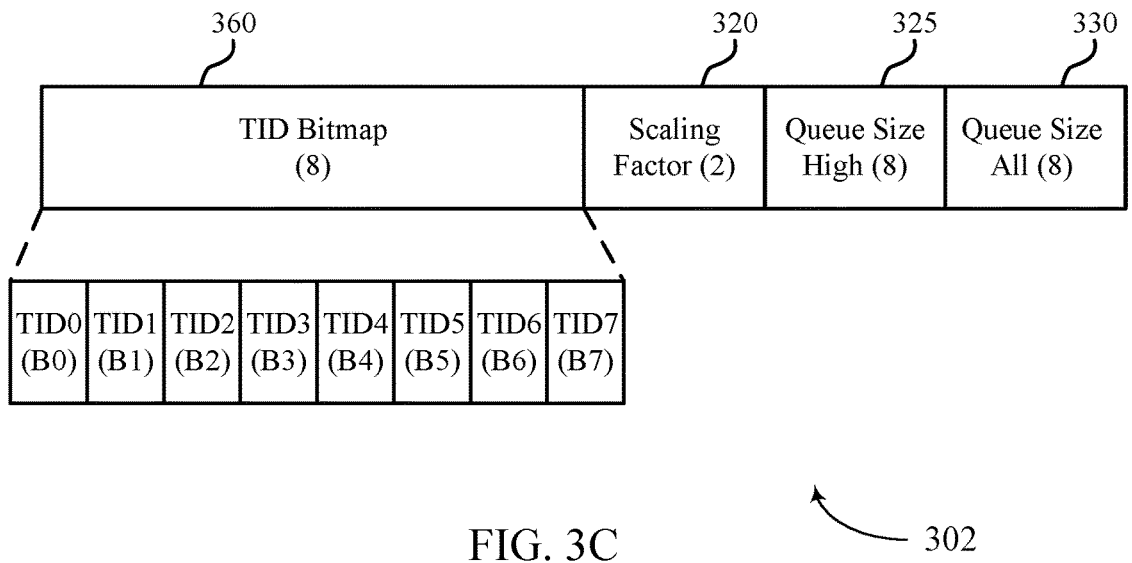

FIG. 3C illustrates an example of a control information subfield 302 (e.g., a BSR control field) for improved TID based buffer status reporting. In some examples, control information subfield 302 may implement aspects of WLAN 100 and WLAN 200. For example, STAs 115 and/or APs 105, which may be examples of the corresponding devices as described with reference to FIGS. 1 and 2, may include control information subfields 302 in MPDUs according to TID based buffer status reporting techniques discussed herein.

Control Information Subfield 302 may include buffer status information (e.g., for uplink MU operation) in accordance with various aspects of the present disclosure. Control Information Subfield 301 may include TID Bitmap subfield 360, Scaling Factor subfield 320, Queue Size High subfield 325, and Queue Size All subfield 330. Further, the Control Information Subfield 302 may include, for example, 26 bits divided over the subfields as shown in parentheses. Specifically, control information subfield 302 may differ from control information subfield 300 in that control information subfield 302 may include TID Bitmap subfield 360 (e.g., in place of the ACI bitmap subfield 305, the Delta TID subfield 310, and the ACI High subfield 315 included in control information subfield 300).

A TID Bitmap subfield 360 (e.g., the ACI bitmap subfield 305, the Delta TID subfield 310, and the ACI High subfield 315 merged together) may include 8 bits that each represent one TID. For example, four ACs (e.g., each associated with two, a high and a low, TIDs) may result in a total of 8 TIDs, and each bit (e.g., each bit location) of the TID Bitmap subfield 360 may be associated with one of the 8 TIDs.

In some cases, aspects of the TID Bitmap subfield 360 may be processed in a similar manner to the ACI bitmap subfield 305. Control Information Subfield 302 may still include the Queue Size High subfield 325 and the Queue Size All subfield 330, and the Queue Size High subfield 325 may correspond to the buffer status of the TID included in the TID Bitmap subfield 360 that is associated with the highest priority, and the Queue Size All subfield 330 may correspond to the cumulative sum of (e.g., collective) buffer status of all TIDs reported by the TID Bitmap subfield 360. For example, if the TID Bitmap subfield 360 includes three set bits (e.g., three of the 8 bits of the TID Bitmap subfield 360 are set to a value of 1), the TIDs associated with the three bit locations may have buffered traffic, and the Queue Size All subfield 330 may represent the traffic buffered for all three TIDs while the Queue Size High subfield 325 may represent the traffic for the highest (e.g., highest priority) TID among the three TIDs indicated by the TID Bitmap subfield 360. For example, a TID Bitmap subfield 360 with a value of '00110010' may indicate the BSR control field includes buffer status information associated with TID2, TID3, and TID6.

In some cases, the Scaling Factor subfield 320 of Control Information Subfield 302 may be repurposed to indicate a TID to be associated with the Queue Size High subfield 325 (e.g., Scaling Factor subfield 320 may in some aspects resemble an ACI High subfield 315, in that the Scaling Factor subfield 320 may override some predetermined TID priority to indicate some other TID is associated with the Queue Size High subfield 325). For example, in such cases, the Scaling Factor subfield 320 of Control Information Subfield 302 may be referred to as a TID High subfield. A TID High subfield may, in some cases, indicate a TID (e.g., a TID other than a TID configured as the higher priority TID) is associated with the Queue Size High subfield 325.

Control Information Subfield 300, Control Information Subfield 301, and Control Information Subfield 302 are illustrated to show examples of the improved TID based buffer status reporting techniques described here. The techniques described herein may be applicable to other scenarios with different or modified control subfields. For example, techniques described with reference to Control Information Subfield 301 may be applicable to Control Information Subfield 300. A receiving wireless device (e.g., a STA 115) may receive an ACI bitmap subfield 305 and a Delta TID subfield 310, and process the bits of these subfields in a manner similar to handling of TID Indication subfield 355. That is, ACI bitmap subfield 305 and Delta TID subfield 310 may be repurposed or reconfigured within a wireless communications system to convey one or two TIDs as discussed with reference to FIG. 3B (e.g., with further reference to TID Indication subfield 355).

As yet another example, some wireless communications systems may utilize traffic stream identifiers (TSIDs), which may take on 16 possible values (e.g., compared to 8 possible TID values). In such cases, 4 TSIDs may potentially be associated with each AC (e.g., with 4 ACs totaling 16 TSIDs). Two bits of the Delta TID (e.g., or Delta TSID) subfield may be used to differentiate between the four TSIDs associated with an AC indicated by the ACI bitmap subfield 305. For example, the Delta TID (e.g., or Delta TSID) subfield 310 may indicate which TSID is associated with the Queue Size High subfield 325, the Queue Size All subfield 330, or both (e.g., cumulative), the specific mapping of which may be standardized or negotiated ahead of time by the communicating wireless devices. Alternatively, the queue sizes included in the BSR control field (e.g., the Queue Size High subfield 325 and Queue Size All subfield 330) may still be associated with higher TSID and lower TSID, as indicated by the Delta TID (e.g., or Delta TSID)

subfield 310. The two TSIDs designated as higher and lower may be standardized or negotiated ahead of time by the communicating wireless devices. For example, if Delta TID is 2 the Queue Size High subfield 325 and the Queue Size All subfields may indicate the cumulative buffer status for the highest TSID (e.g., of the 4 TSIDs) of that AC, if Delta TID is 3 then Queue Size High subfield 325 may indicate the buffer status for the highest TSID (e.g., of the 4 TSIDs) of that AC and the Queue Size All subfield 330 may indicate the buffer status for the lowest TSID (e.g., of the 4 TSIDs) of that AC, etc.

The techniques discussed herein are not limited to any particular configuration of control information subfields, and may be applied across various subfields according to system configuration/implementation. Subfield merging and subfield repurposing techniques for TID based buffer status reporting, as discussed above, may be combined in different combinations than those explicitly illustrated or described by analogy, without departing from the scope of the present disclosure.

Figure 4:
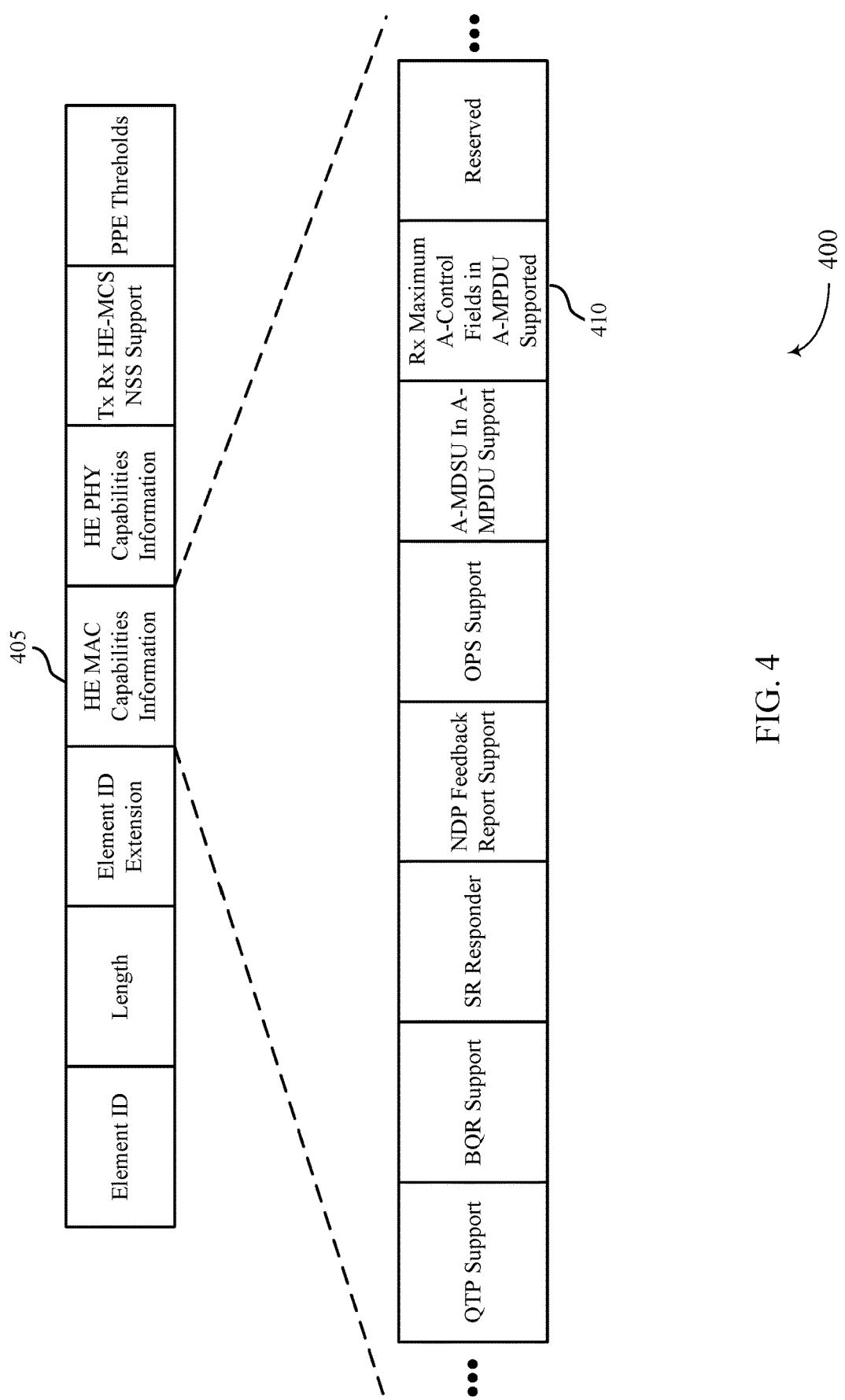
FIG. 4 illustrates an example of a capabilities element that supports improved TID based buffer status reporting in accordance with aspects of the present disclosure.

FIG. 4 illustrates an example of a capabilities element 400 for indicating control field support for A-MPDUs that include MPDUs having different control information in their respective headers. For example, an AP 105 or other receiving STA 115 may transmit the capabilities element 400 to a transmitting STA 115. The capabilities element 400 may indicate to the transmitting STA 115 that the AP 105 or other receiving STA 115 is capable of receiving processing multiple MPDU headers carrying different control information in a single A-MPDU in accordance with techniques discussed herein.

Capabilities element 400 may include an HE MAC Capabilities Information Field 405 that further includes a Rx Maximum A-Control Fields In A-MPDU Support subfield 410. Such a Rx Maximum A-Control Fields In A-MPDU Support subfield 410 may be used to indicate whether a STA 115 supports receiving HE variant HT Control fields in MPDUs aggregated in the same A-MPDU.

The HE MAC Capabilities Information Field 405 may contain 6 octets of information and may include a Rx Maximum A-Control Fields In A-MPDU Support subfield 410. Such a Rx Maximum A-Control Fields In A-MPDU Support subfield 410 may include 3 bits that fill B39 to B41 of the HE MAC capabilities Information Field 405 frame structure.

Rx Maximum A-Control Fields In A-MPDU Support subfield 410 may indicate whether a STA 115 supports receiving different HE-variant HT Control fields in MPDUs aggregated in the same A-MPDU. Rx Maximum A-Control Fields In A-MPDU Support subfield 410 may be set to a non-zero value to indicate that a STA 115 doesn't support receiving different values of HE A-Control fields in MPDUs aggregated in the same A-MPDU. Alternatively, Rx Maximum A-Control Fields In A-MPDU Support subfield 410 may be set to a non-zero value to indicate the maximum number of different HE A-Control fields the STA 115 may receive in MPDUs aggregated in the same A-MPDU.

TABLE 4.1

| Subfield | Definition | Encoding |
|---|---|---|
| Rx Maximum A-Control Fields In A-MPDU Supported | Indicates whether the STA supports receiving different HE variant HT Control fields in MPDUs aggregated in the same A-MPDU. | Set to 0 to indicate the STA doesn't support receiving different values of HE A-Control fields in MPDUs aggregated in the same A-MPDU. Set to a non-zero value to indicate the maximum number of different HE A-Control fields the STA can receive in MPDUs aggregated in the same A-MPDU. |

If the HE STA 115 includes a very high throughput (VHT) Capabilities element, the Maximum A-MPDU Length Exponent subfield in the HE Capabilities element combined with the Maximum A-MPDU Length Exponent subfield in the VHT Capabilities element may indicate the maximum A-MPDU length that the STA 115 may receive (e.g., with end of frame (EOF) padding not included in this limit). If the Maximum A-MPDU Length Exponent subfield in HE Capabilities element is 0, then the value of the Maximum A-MPDU Length Exponent subfield in the VHT Capabilities element may indicate the maximum A-MPDU length that the STA 115 may receive. If the Maximum A-MPDU Length Exponent subfield in the HE Capabilities element is greater than 0, then the value in the Maximum A-MPDU Length Exponent subfield in the VHT Capabilities element may be 7 and the maximum A-MPDU length may be $$2^{(20 + \text{Maximum A-MPDU Length Exponent subfield in the HE Capabilities element})} - 1.$$

If the HE STA 115 does not include the VHT Capabilities element, then the Maximum A-MPDU Length Exponent subfield in the HE Capabilities element combined with the Maximum A-MPDU Length Exponent subfield in the HT Capabilities element may indicate the maximum A-MPDU length that the STA 115 may receive (e.g., with EOF padding not included in this limit). If the Maximum A-MPDU Length Exponent subfield in the HE Capabilities element is 0, then the value in the Maximum A-MPDU Length Exponent subfield in the HT Capabilities element may indicate the maximum A-MPDU length that the STA 115 can receive. If the Maximum A-MPDU Length Exponent subfield in the HE Capabilities element is greater than 0, then the value in the Maximum A-MPDU Length Exponent subfield in the HT Capabilities element may be 7 and the maximum A-MPDU length may be $2^{(16 + \text{Maximum A-MPDU Length Exponent subfield in the HE Capabilities element})} - 1$.

Figure 5:
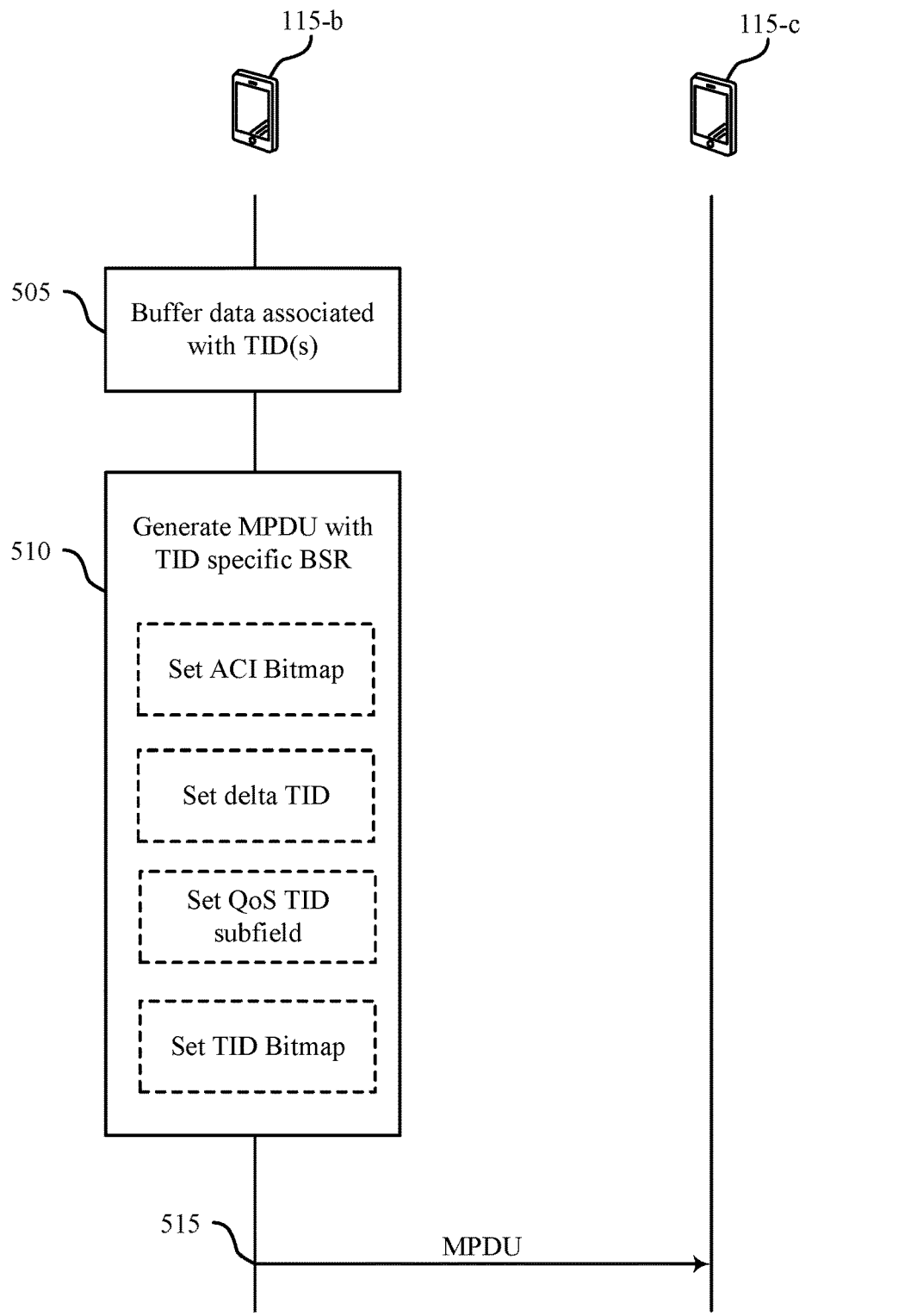
FIG. 5 illustrates an example of a process flow that supports improved TID based buffer status reporting in accordance with aspects of the present disclosure.

FIG. 5 illustrates an example of a process flow 500 for TID based buffer status reporting in accordance with various aspects of the present disclosure. Process flow 500 may implement aspects of WLAN 100 and WLAN 200. For example, process flow 500 may include a first STA 115-*b* and a second STA 115-*c*, which may be examples of the corresponding devices as described with reference to FIGS. 1 and 2. In some examples, second STA 115-*b* may implement an AP 105. Further second STA 115-*b* may generate one or more MPDUs that may include BSR control fields and/or QoS control fields, which may be examples of the corresponding fields as described with references to FIGS. 2 and 3. It should be appreciated that the buffer status reporting techniques discussed are illustrated for exemplary purposes, and may be applied to STA 115 to STA 115 communications, STA 115 to AP 105 communications, AP 105 to AP 105 communications, etc. by analogy, without departing from the scope of the present disclosure.

At 505, the first STA 115-*b* may buffer data associated with one or more TIDs. The wireless station may be one of a WLAN.

At 510, the first STA 115-*b* may generate an MPDU including a BSR control field based on the buffering of data associated with one or more TIDs in 505. Such a BSR may include an ACI bitmap, a delta TID parameter, a first queue size parameter, and a second queue size parameter. The ACI bitmap and the delta TID parameter may indicate a mapping of buffer status information for the one or more TIDs to the first queue size parameter and second queue size parameter. The delta TID parameter may be set to indicate a value associated with the number of TIDs that have buffered traffic. Such a value may be used to indicate that the first queue size parameter and the second queue size parameter cumulatively (e.g., collectively) correspond to the buffer status of a single TID of the set of one or more TIDs. In such a case, the TID may be the highest TID of an AC associated with the ACI bitmap or the TID may be the lowest TID. The delta TID parameter may alternatively be used to indicate that the first queue size parameter corresponds to a first buffer status for a first TID of the set of one or more buffered TIDs and the second queue size parameter corresponds to a second buffer status for a second TID of the set of one or more buffered TIDs. The first and the second TID may be at different priority levels. Finally, the delta TID parameter may indicate that the first queue size parameter corresponds to a first TID of the set of one or more buffered TIDs and that the second queue size parameter may correspond to a second buffer status for a plurality of TIDs of the set of one or more buffered TIDs. Whether the delta TID parameter indicates a single buffer status or two separate buffer statuses may depend on a combination of the delta TID parameter value and the number of bits in the ACI Bitmap that are set to 1. In some embodiments, the ACI bitmap may be set to indicate a set of one or more ACs, including an AC of the one or more buffered TIDs. Moreover, such a set of one or more ACs may include a plurality of categories. In some examples, an AC high parameter of the BSR control field may be set to indicate an AC of the one or more buffered TIDs.

At 515, the first STA 115-*b* may send out BSR control field transmission to the second STA 115-*c*, which may be sent over one or more MPDUs.

Figure 6:
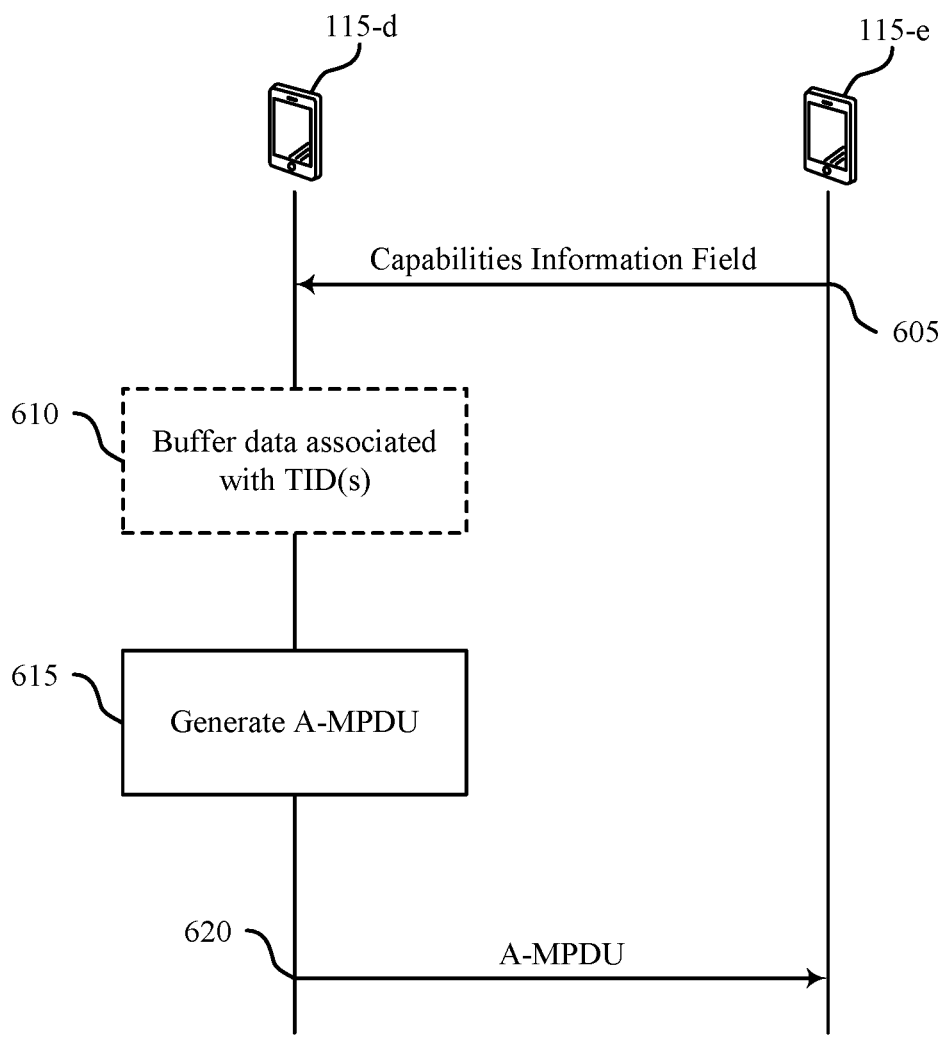
FIG. 6 illustrates an example of a process flow that supports indication of control field support for aggregate media access control (MAC) protocol data unit (MPDU) (A-MPDUs) that include MPDUs with different control information in accordance with aspects of the present disclosure.

FIG. 6 illustrates an example of a process flow 600 for indicating control field support for A-MPDUs that include MPDUs with different control information in accordance with various aspects of the present disclosure. Process flow 600 may implement aspects of WLAN 100 and WLAN 200. For example, process flow 600 may include a first STA 115-*d* and a second STA 115-*e*, which may be examples of the corresponding devices as described with reference to FIGS. 1 and 2. In some cases, STA 115-*e* may implement an AP 105. Further STA 115-*d* may generate A-MPDUs that include MPDUs with different control information (e.g., MPDUs with different control field types or Type subfields of the Frame Control field) which may be examples of the corresponding fields as described with references to FIGS. 2 and 4. It should be appreciated that the buffer status reporting techniques discussed are illustrated for exemplary purposes, and may be applied to STA 115 to AP 105 communications, AP 105 to AP 105 communications, etc. by analogy, without departing from the scope of the present disclosure.

At 605, the first STA 115-*d*, which may be of a WLAN, may receive a capabilities information field (e.g., an HE MAC capabilities information field) from a second STA 115-*e*, which may also be of a WLAN. The capabilities information field may indicate a number of different HE A-Control fields that the second STA 115-*e* is capable of receiving in different MPDUs of one A-MPDU packet.

At 610, STA 115-*d* in some cases may buffer data associated with one or more TID(s).

At 615, the first STA 115-*d* may generate an A-MPDU packet including a plurality of MPDUs, where at least a portion of the MPDUs may include different HE A-Control fields, based on the received HE MAC capabilities information. In one embodiment, data associated with one or more TIDs for transmission to second STA 115-*e* may be buffered. In such an embodiment, the HE A-Control field for each MPDU of the portion of the MPDUs (i.e. those with different HE A-control fields) may include different BSR control field values based on buffering the data associated with one or more TIDs. Further, the different BSR control field values may be set to indicate buffer status information for different TIDs of the one or more TIDs. The BSR Control fields may also indicate buffer status information for TIDs associated with different ACs. In some examples, the different HE A-Control fields for the portion of the MPDUs may include one or more of a BSR, control fields, OM control fields, HLA, UPH control fields, BQR control fields, command control indication control fields, or a combination thereof.

At 620, the first STA 115-*d* may transmit the A-MPDU packet 620 to the second STA 115-*e*.

Figure 7:
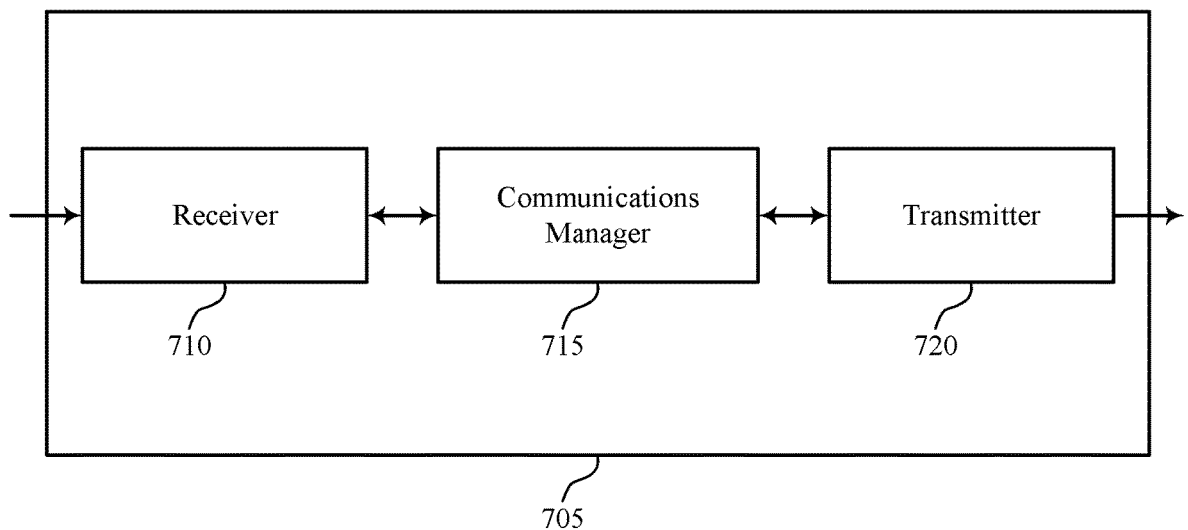
FIGS. 7 through 9 show block diagrams of devices that support improved TID based buffer status reporting in accordance with aspects of the present disclosure.

FIG. 7 shows a block diagram 700 of a device 705 that supports improved TID based buffer status reporting in accordance with aspects of the present disclosure. The device 705 may be an example of aspects of a STA 115 as described herein. The device 705 may include a receiver 710, a communications manager 715, and a transmitter 720. The device 705 may also include a processor. Each of these components may be in communication with one another (e.g., via one or more buses).

Receiver 710 may receive information such as packets, user data, or control information associated with various information channels (e.g., control channels, data channels, and information related to improved TID based buffer status reporting, etc.). Information may be passed on to other components of the device. The receiver 710 may be an example of aspects of the transceiver 1020 described with reference to FIG. 10. The receiver 710 may utilize a single antenna or a set of antennas.

The communications manager 715 may buffer data associated with one or more TIDs for transmission to a second wireless station of the WLAN and generate an MPDU including a BSR control field based on the buffering. In some cases, the BSR control field may include an ACI bitmap, a delta TID parameter, a first queue size parameter, and a second queue size parameter, where the ACI bitmap and the delta TID parameter indicate a mapping of buffer status information for the one or more TIDs to the first queue size parameter and the second queue size parameter. The communications manager 715 may transmit the MPDU to the second wireless station. The communications manager 715 may also receive a capabilities information field from a second wireless station of the WLAN, where the capabilities information field indicates a number of different A-Control fields that a second wireless station is capable of receiving in different MPDUs of one A-MPDU. The communications manager 715 may generate an A-MPDU including a set of MPDUs, where at least a portion of the set of MPDUs include different A-Control fields based on the received capabilities information. The communications manager 715 may transmit the A-MPDU packet to the second wireless station. The communications manager 715 may also buffer data associated with a TID or an AC for transmission to a second wireless station of the WLAN and generate an MPDU including a BSR control field based on the buffering, where the BSR control field includes information related to TIDs or ACs, a first queue size parameter, and a second queue size parameter. In some cases, the information related to TIDs or ACs indicates a mapping of buffer status information for the TID or the AC to the first queue size parameter and the second queue size parameter, and the first queue size parameter and the second queue size parameter collectively correspond to a buffer status for the TID or the AC. The communications manager 715 may transmit the MPDU to the second wireless station. The communications manager 715 may be an example of aspects of the communications manager 1010 described with reference to FIG. 10.

The communications manager 715 or its sub-components, may be implemented in hardware, code (e.g., software or firmware) executed by a processor, or any combination thereof. If implemented in code executed by a processor, the functions of the communications manager 715 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 715 or its sub-components, may be physically located at various positions, including being distributed such that portions of functions are implemented at different physical locations by one or more physical devices. In some examples, the communications manager 715 or its sub-components may be a separate and distinct component in accordance with various aspects of the present disclosure. In some examples, the communications manager 715 or its sub-components may be combined with one or more other hardware components, including but not limited to an input/output (I/O) component, a transceiver, a network server, another computing device, one or more other components described in the present disclosure, or a combination thereof in accordance with various aspects of the present disclosure.

Transmitter 720 may transmit signals generated by other components of the device. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

Figure 8:
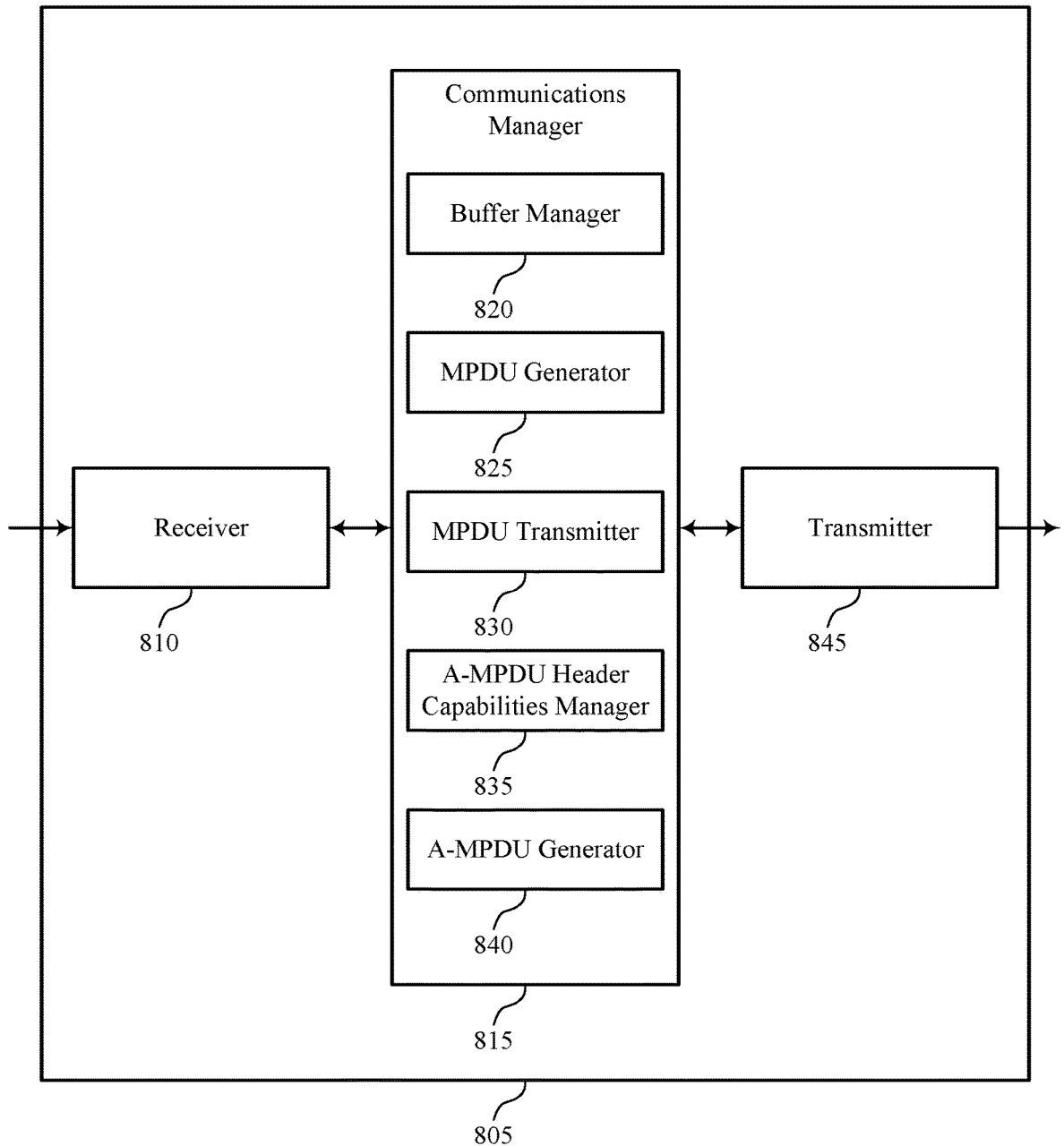

FIG. 8 shows a block diagram 800 of a device 805 that supports improved TID based buffer status reporting in accordance with aspects of the present disclosure. The device 805 may be an example of aspects of a device 705 or a STA 115 as described with reference to FIGS. 1 and 7. The device 805 may include a receiver 810, a communications manager 815, and a transmitter 845. The device 805 may also include a processor. Each of these components may be in communication with one another (e.g., via one or more buses).

Receiver 810 may receive information such as packets, user data, or control information associated with various information channels (e.g., control channels, data channels, and information related to improved TID based buffer status reporting, etc.). Information may be passed on to other components of the device. The receiver 810 may be an example of aspects of the transceiver 1020 described with reference to FIG. 10. The receiver 810 may utilize a single antenna or a set of antennas.

The communications manager 815 may also include a buffer manager 820, a MPDU generator 825, an MPDU transmitter 830, an a-MPDU header capabilities manager 835, and an a-MPDU generator 840. The communications manager 815 may be an example of aspects of the communications manager 1010 described with reference to FIG. 10.

The buffer manager 820 may buffer, by a first wireless station of a WLAN, data associated with one or more TIDs for transmission to a second wireless station of the WLAN. The buffer manager 820 may buffer, by a first wireless station of a WLAN, data associated with one or more TIDs for transmission to a second wireless station of the WLAN.

The MPDU generator 825 may generate an MPDU including a BSR control field based on the buffering, the BSR control field including an ACI bitmap, a delta TID parameter, a first queue size parameter, and a second queue size parameter; where the ACI bitmap and the delta TID parameter indicate a mapping of buffer status information for the one or more TIDs to the first queue size parameter and the second queue size parameter. The MPDU generator 825 may generate a MPDU comprising a BSR control field based at least in part on the buffering, the BSR control field comprising TID information or AC information, a first queue size parameter, and a second queue size parameter; where the TID information indicates a mapping of buffer status information for the TID or the AC to the first queue size parameter and the second queue size parameter, and the first queue size parameter and the second queue size parameter collectively correspond to a buffer status for the TID or the AC. In some cases, as part of generating the MPDU, the MPDU generator 825 may determine the buffer status based at least in part on the buffering and may determine the first queue size parameter and the second queue size parameter, where a summation of the first queue size parameter and the second queue size parameter indicate the buffer status. In some cases, the MPDU may include a QoS control field, and MPDU generator 825, as part of generating the MPDU, may determine the buffer status base at least in part on the buffering and may determine the first queue size parameter, the second queue size parameter, and a third queue size parameter corresponding to the QoS control field, where a summation of the first queue size parameter, the second queue size parameter, and the third queue size parameter indicate the buffer status.

The MPDU transmitter 830 may transmit the MPDU to the second wireless station. The MPDU transmitter 830 may transmit the A-MPDU packet to the second wireless station. The MPDU transmitter 830 may transmit the MPDU to the second wireless station.

The A-MPDU header capabilities manager 835 may receive a capabilities information field from a second wireless station of the WLAN, the capabilities information field indicating a number of different A-Control fields that a second wireless station is capable of receiving in different MPDUs of one A-MPDU.

The A-MPDU generator 840 may generate an A-MPDU including a set of MPDUs, where at least a portion of the set of MPDUs include different A-Control fields based on the received capabilities information.

Transmitter 845 may transmit signals generated by other components of the device. In some examples, the transmitter 845 may be collocated with a receiver 810 in a transceiver module. For example, the transmitter 845 may be an example of aspects of the transceiver 1020 described with reference to FIG. 10. The transmitter 845 may utilize a single antenna or a set of antennas.

Figure 9:
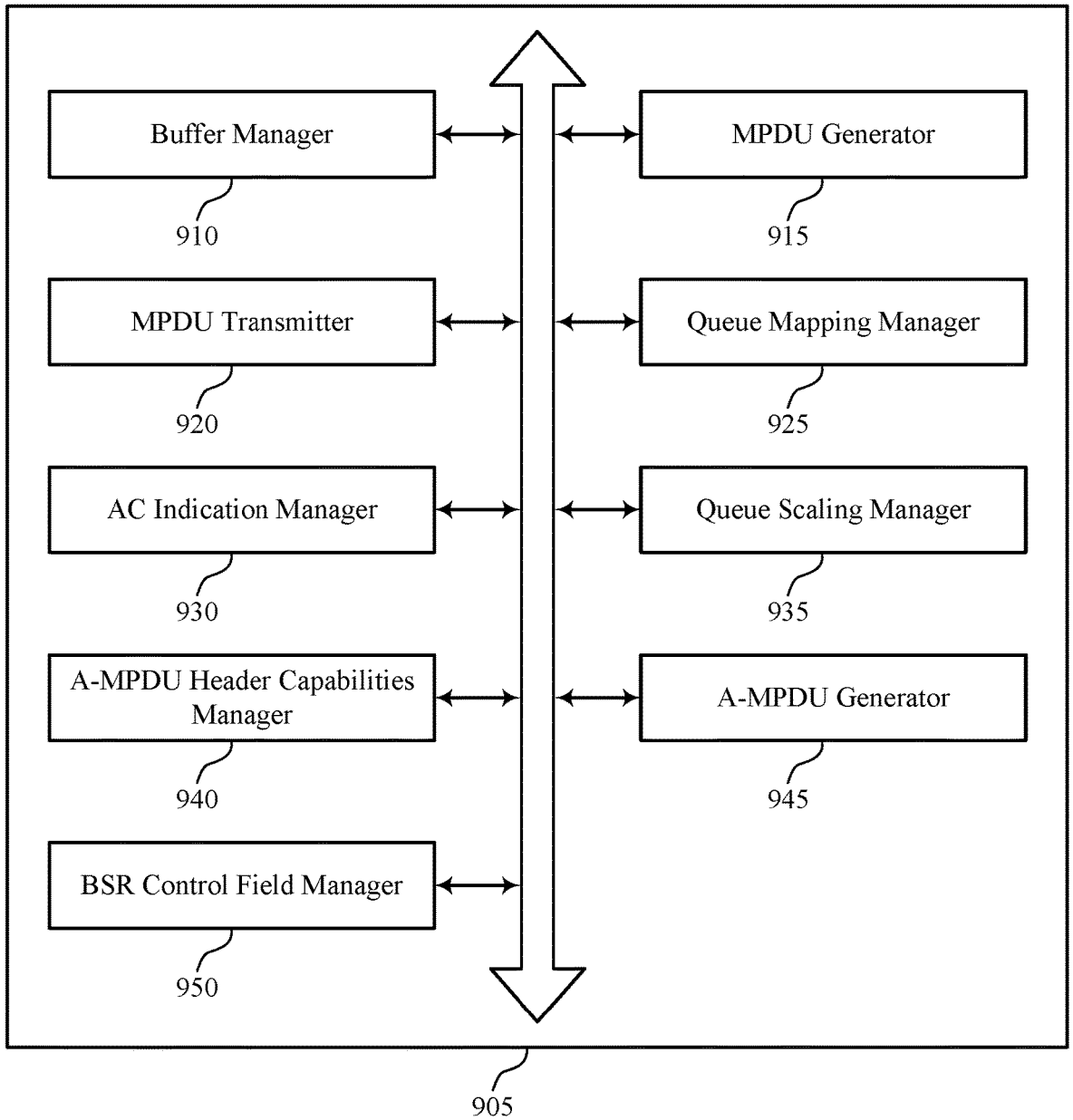

FIG. 9 shows a block diagram 900 of a communications manager 905 that supports improved TID based buffer status reporting in accordance with aspects of the present disclosure. The communications manager 905 may be an example of aspects of a communications manager 715, a communications manager 815, or a communications manager 1010 described with reference to FIGS. 7, 8, and 10. The communications manager 905 may include a buffer manager 910, a MPDU generator 915, an MPDU transmitter 920, a queue mapping manager 925, an AC indication manager 930, a queue scaling manager 935, an a-MPDU header capabilities manager 940, an a-MPDU generator 945, and a BSR control field manager 950. Each of these modules may communicate, directly or indirectly, with one another (e.g., via one or more buses).

The buffer manager 910 may buffer, by a first wireless station of a WLAN, data associated with one or more TIDs for transmission to a second wireless station of the WLAN. In some examples, the buffer manager 910 may buffer, by a first wireless station of a WLAN, data associated with one or more TIDs for transmission to a second wireless station of the WLAN. In some examples, the buffer manager 910 may buffer data associated with one or more TIDs for transmission to a second wireless station of the WLAN, where an HE A-Control field for each MPDU of the portion of the MPDUs includes different BSR control field values based on the buffering. In some cases, the one or more TIDs include an AC. The buffer manager 910 may buffer, by a first wireless station of a WLAN, data associated with the TID or the AC for transmission to a second wireless station of the WLAN.

The MPDU generator 915 may generate an MPDU including a BSR control field based on the buffering, the BSR control field including an ACI bitmap, a delta TID parameter, a first queue size parameter, and a second queue size parameter; where the ACI bitmap and the delta TID parameter indicate a mapping of buffer status information for the one or more TIDs to the first queue size parameter and the second queue size parameter. In some examples, the MPDU generator 915 generate a MPDU comprising a BSR control field based at least in part on the buffering, the BSR control field comprising TID information or AC information, a first queue size parameter, and a second queue size parameter; where the TID information indicates a mapping of buffer status information for the TID or the AC to the first queue size parameter and the second queue size parameter, and the first queue size parameter and the second queue size parameter collectively correspond to a buffer status for the TID or the AC. In some cases, the generated MPDU further includes a QoS control field based on the buffering, the QoS control field including a third queue size parameter and a TID subfield. In some cases, the third queue size parameter and at least one of the first queue size parameter and the second queue size parameter, collectively correspond to a buffer status for a single TID of the one or more TIDs and where the ACI bitmap indicates an AC to which the single TID corresponds to. In some cases, the single TID of the one or more TIDs includes a highest TID of the AC associated with the ACI bitmap or a lowest TID of the AC associated with the ACI bitmap, and where the single TID is indicated by the TID subfield of the QoS control field and the value of the delta TID parameter. In some cases, the TID subfield indicates the third queue size parameter corresponds to a buffer status for a TID other than the one or more TIDs indicated by the value of the delta TID parameter. In some cases, the third queue size parameter corresponds to a buffer status for an AC, and where the AC is indicated by the TID subfield. In some cases, as part of generating the MPDU, the MPDU generator 915 may determine the buffer status based at least in part on the buffering and may determine the first queue size parameter and the second queue size parameter, where a summation of the first queue size parameter and the second queue size parameter indicate the buffer status. In some cases, the MPDU may include a QoS control field, and MPDU generator 915, as part of generating the MPDU, may determine the buffer status base at least in part on the buffering and may determine the first queue size parameter, the second queue size parameter, and a third queue size parameter corresponding to the QoS control field, where a summation of the first queue size parameter, the second queue size parameter, and the third queue size parameter indicate the buffer status.

In some examples, the MPDU transmitter 920 may transmit the A-MPDU packet to the second wireless station. In some examples, the MPDU transmitter 920 may transmit the MPDU to the second wireless station.

The queue mapping manager 925 may set a value of the delta TID parameter to indicate at least a number of the one or more TIDs. In some cases, the value of the delta TID parameter indicates that the first queue size parameter and the second queue size parameter collectively correspond to a buffer status for a single TID of the one or more TIDs, and where the ACI bitmap indicates an AC to which the single TID corresponds to. In some cases, the single TID of the one or more TIDs includes a highest TID of the AC associated with the ACI bitmap or a lowest TID of the AC associated with the ACI bitmap. In some cases, the value of the delta TID parameter indicates that the first queue size parameter corresponds to a first buffer status for a first TID of the one or more TIDs and the second queue size parameter corresponds to a second buffer status for a second TID of the one or more TIDs, and where the ACI bitmap indicates an AC to which the first TID and the second TID correspond to. In some cases, the first TID and the second TID include different priority levels. In some cases, the value of the delta TID parameter indicates that the first queue size parameter corresponds to a first buffer status of a first TID of the one or more TIDs and the second queue size parameter corresponds to a second buffer status for a set of TIDs of the one or more TIDs. In some cases, the scaling factor parameter indicates that the first queue size parameter corresponds to a buffer status for a first TID of the one or more TIDs, where the second queue size parameter corresponds to TIDs of the one or more TIDs other than the first TID. In some cases, the value of the ACI bitmap, the delta TID parameter, and the ACI High parameter collectively indicates one TID, and where the first queue size parameter and the second queue size parameter collectively correspond to a buffer status for the one TID. In some cases, the ACI bitmap indicates a value corresponding to a TID of the one or more TIDs. In some cases, the first queue size parameter and the second queue size parameter collectively correspond to a buffer status for the TID. In some cases, the ACI bitmap and the delta TID parameter collectively indicate a value corresponding to a first TID and a second TID of the one or more TIDs. In some cases, the first queue size parameter corresponds to a first buffer status for the first TID and the second queue size parameter corresponds to a second buffer status for the second TID.

The AC Indication manager 930 may set the ACI bitmap to indicate a set of one or more ACs including an AC of the one or more TIDs. In some examples, the AC Indication manager 930 may set an AC high parameter of the BSR control field to indicate the AC of the one or more TIDs.

The queue scaling manager 935 may set a value of the ACI bitmap, the delta TID parameter, and the ACI High parameter to collectively indicate the one or more TIDs. In some cases, the BSR control field further includes an access category indicator High (ACI High) parameter and a scaling factor parameter. In some cases, the ACI bitmap indicates a single AC, and where the ACI High parameter and the scaling factor parameter collectively correspond to a scaling factor value associated with the first queue size parameter and the second queue size parameter. In some cases, the ACI bitmap indicates a single AC, and where the ACI High parameter corresponds to a first scaling factor value associated with the first queue size parameter and the scaling factor parameter corresponds to a second scaling factor value associated with the second queue size parameter.

The A-MPDU header capabilities manager 940 may receive, by a first wireless station of a WLAN, a capabilities information field from a second wireless station of the WLAN, the capabilities information field indicating a number of different A-Control fields that a second wireless station is capable of receiving in different MPDUs of one A-MPDU.

The A-MPDU generator 945 may generate an A-MPDU including a set of MPDUs, where at least a portion of the set of MPDUs include different A-Control fields based on the received capabilities information.

The BSR control field manager 950 may set the different BSR control field values to indicate buffer status information for different TIDs of the one or more TIDs. In some examples, the BSR control field manager 950 may BSR control fields, OM control fields, HLA control fields, UPH control fields, BQR control fields, command control fields, status control fields, or a combination thereof. In some cases, the different BSR control fields indicate buffer status information for TIDs associated with different ACs.

Figure 10:
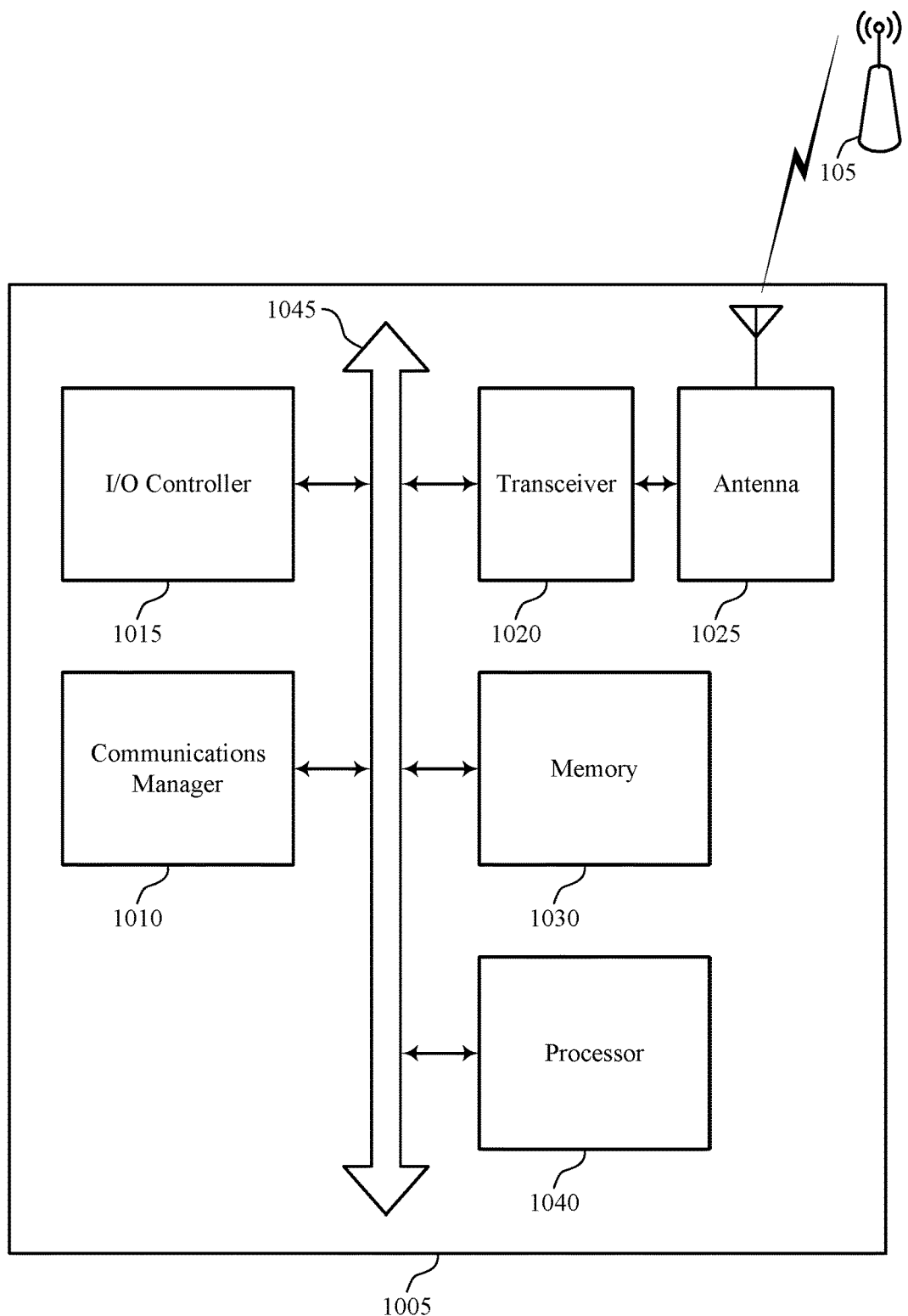
FIG. 10 illustrates a block diagram of a system including a station (STA) that supports improved TID based buffer status reporting in accordance with aspects of the present disclosure.

FIG. 10 shows a diagram of a system 1000 including a device 1005 that supports improved TID based buffer status reporting in accordance with aspects of the present disclosure. The device 1005 may be an example of or include the components of device 705, device 805, or a STA 115 as described above, e.g., with reference to FIGS. 7 and 8. The device 1005 may include components for bi-directional voice and data communications including components for transmitting and receiving communications, including a communications manager 1010, a I/O controller 1015, a transceiver 1020, an antenna 1025, a memory 1030, and a processor 1040. These components may be in electronic communication via one or more buses (e.g., bus 1045).

I/O controller 1015 may manage input and output signals for device 1005. I/O controller 1015 may also manage peripherals not integrated into device 1005. In some cases, I/O controller 1015 may represent a physical connection or port to an external peripheral. In some cases, I/O controller 1015 may utilize an operating system such as iOS®, ANDROID®, MS-DOS®, MS-WINDOWS®, OS/2®, UNIX®, LINUX®, or another known operating system. In other cases, I/O controller 1015 may represent or interact with a modem, a keyboard, a mouse, a touchscreen, or a similar device. In some cases, I/O controller 1015 may be implemented as part of a processor. In some cases, a user may interact with device 1005 via I/O controller 1015 or via hardware components controlled by I/O controller 1015.

Transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

Memory 1030 may include random-access memory (RAM) and read-only memory (ROM). The memory 1030 may store computer-readable, computer-executable software 1035 including instructions that, when executed, cause the processor to perform various functions described herein. In some cases, the memory 1030 may contain, among other things, a basic input/output system (BIOS) which may control basic hardware or software operation such as the interaction with peripheral components or devices.

Processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1040 may be configured to operate a memory array using a memory controller. In other cases, a memory controller may be integrated into processor 1040. Processor 1040 may be configured to execute computer-readable instructions stored in a memory to perform various functions (e.g., functions or tasks supporting improved TID based buffer status reporting).

Figure 11:
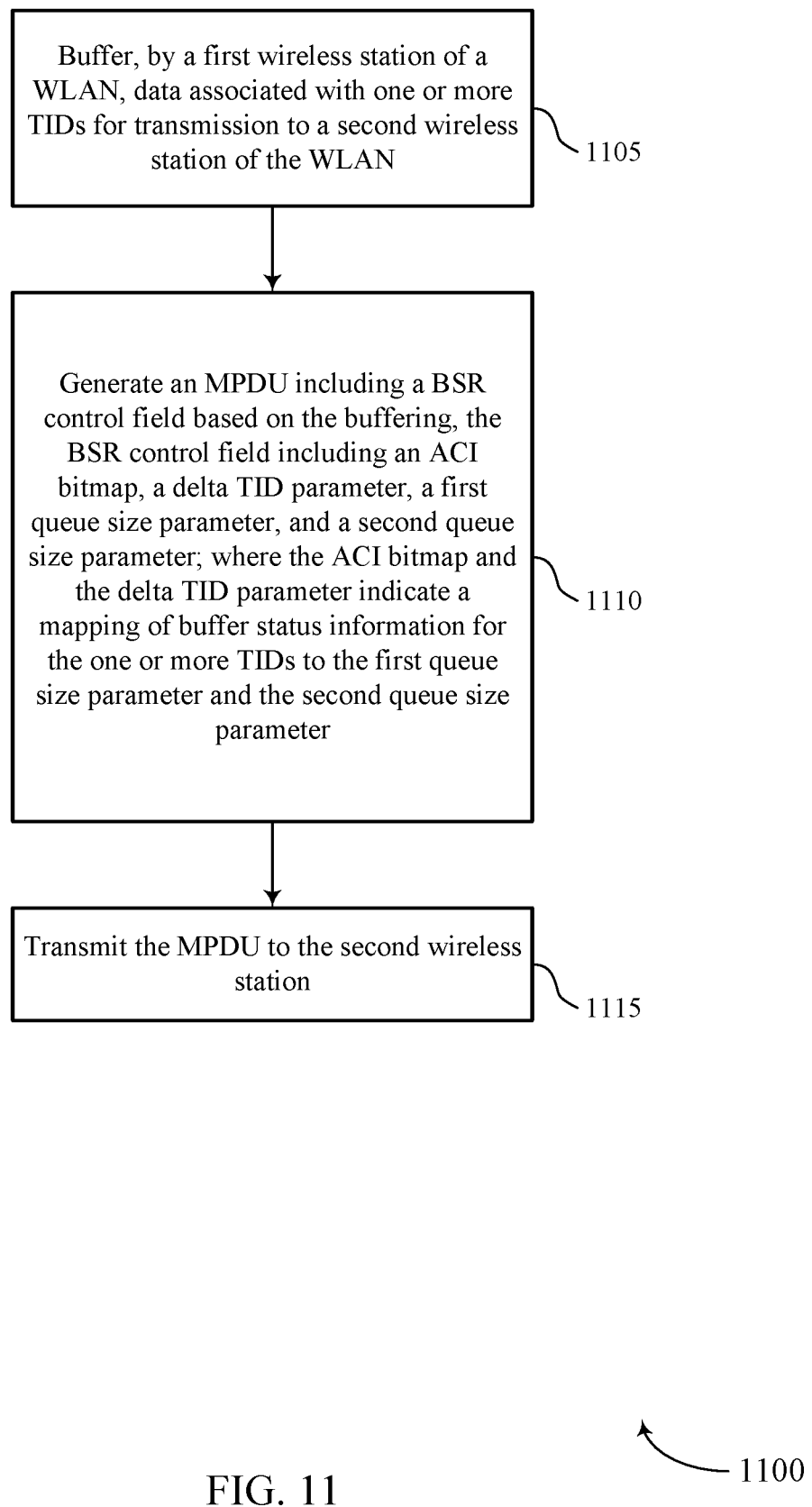
FIGS. 11 through 14 illustrate methods for improved TID based buffer status reporting in accordance with aspects of the present disclosure.

FIG. 11 shows a flowchart illustrating a method 1100 for improved TID based buffer status reporting in accordance with aspects of the present disclosure. The operations of method 1100 may be implemented by a STA 115 or its components as described herein. For example, the operations of method 1100 may be performed by a communications manager as described with reference to FIGS. 7 to 10. In some examples, a STA 115 may execute a set of instructions to control the functional elements of the STA 115 to perform the functions described below. Additionally or alternatively, a STA 115 may perform aspects of the functions described below using special-purpose hardware.

At 1105 the STA 115 may buffer, by a first wireless station of a WLAN, data associated with one or more TIDs for transmission to a second wireless station of the WLAN. The operations of 1105 may be performed according to the methods described herein. In some examples, aspects of the operations of 1105 may be performed by a buffer manager as described with reference to FIGS. 7 to 10.

At 1110 the STA 115 may generate an MPDU including a BSR control field based on the buffering, the BSR control field including an ACI bitmap, a delta TID parameter, a first queue size parameter, and a second queue size parameter; where the ACI bitmap and the delta TID parameter indicate a mapping of buffer status information for the one or more TIDs to the first queue size parameter and the second queue size parameter. The operations of 1110 may be performed according to the methods described herein. In some examples, aspects of the operations of 1110 may be performed by an MPDU generator as described with reference to FIGS. 7 to 10.

At 1115 the STA 115 may transmit the MPDU to the second wireless station. The operations of 1115 may be performed according to the methods described herein. In some examples, aspects of the operations of 1115 may be performed by an MPDU transmitter as described with reference to FIGS. 7 to 10.

Figure 12:
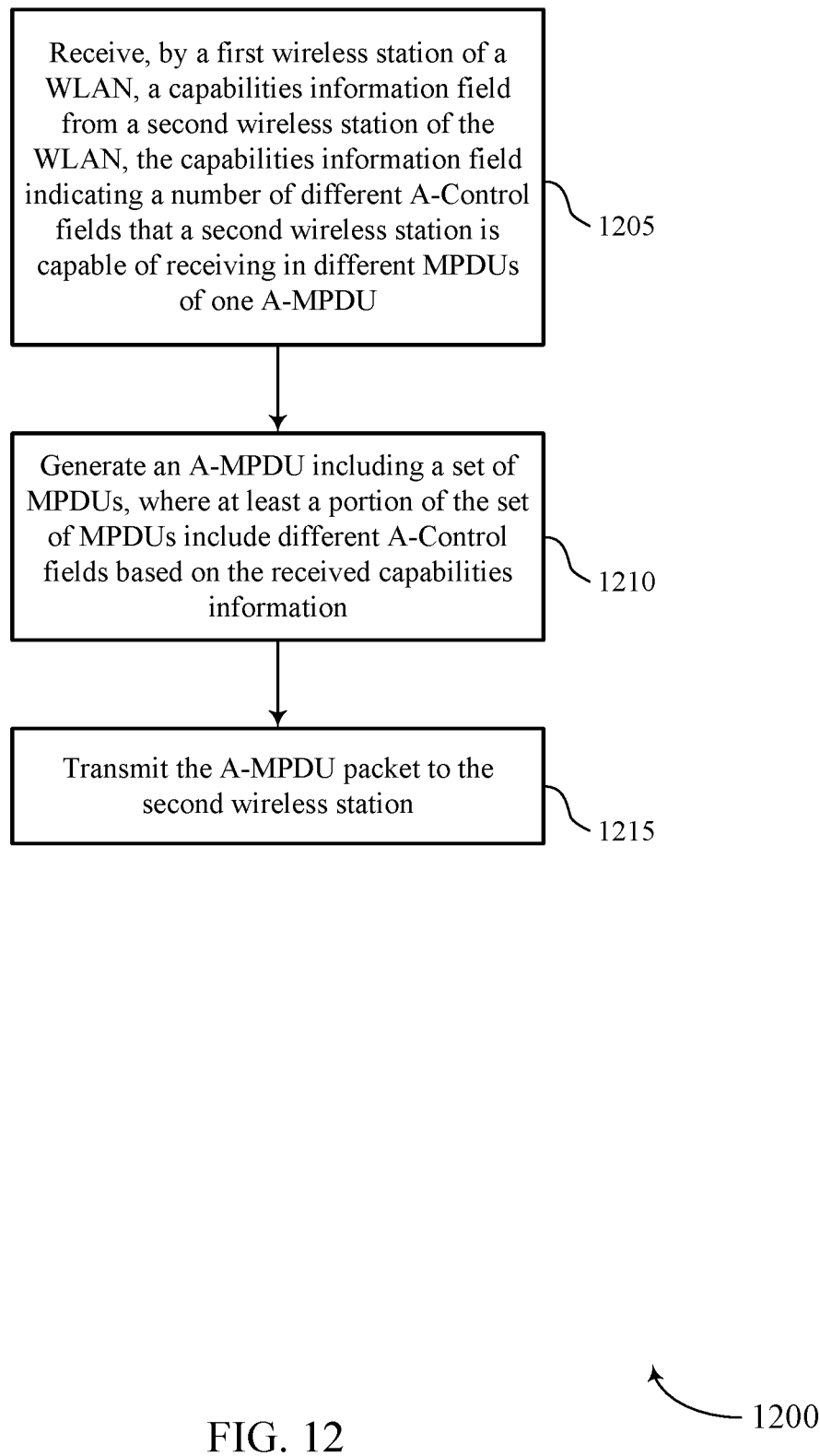

FIG. 12 shows a flowchart illustrating a method 1200 for improved TID based buffer status reporting in accordance with aspects of the present disclosure. The operations of method 1200 may be implemented by a STA 115 or its components as described herein. For example, the operations of method 1200 may be performed by a communications manager as described with reference to FIGS. 7 to 10. In some examples, a STA 115 may execute a set of instructions to control the functional elements of the STA 115 to perform the functions described below. Additionally or alternatively, a STA 115 may perform aspects of the functions described below using special-purpose hardware.

At 1205 the STA 115 may receive, by a first wireless station of a WLAN, a capabilities information field from a second wireless station of the WLAN, the capabilities information field indicating a number of different A-Control fields that a second wireless station is capable of receiving in different MPDUs of one A-MPDU. The operations of 1205 may be performed according to the methods described herein. In some examples, aspects of the operations of 1205 may be performed by an A-MPDU header capabilities manager as described with reference to FIGS. 7 to 10.

At 1210 the STA 115 may generate an A-MPDU including a plurality of MPDUs, where at least a portion of the plurality of MPDUs include different A-Control fields based on the received capabilities information. The operations of 1210 may be performed according to the methods described herein. In some examples, aspects of the operations of 1210 may be performed by an A-MPDU generator as described with reference to FIGS. 7 to 10.

At 1215 the STA 115 may transmit the A-MPDU packet to the second wireless station. The operations of 1215 may be performed according to the methods described herein. In some examples, aspects of the operations of 1215 may be performed by an MPDU transmitter as described with reference to FIGS. 7 to 10.

Figure 13:
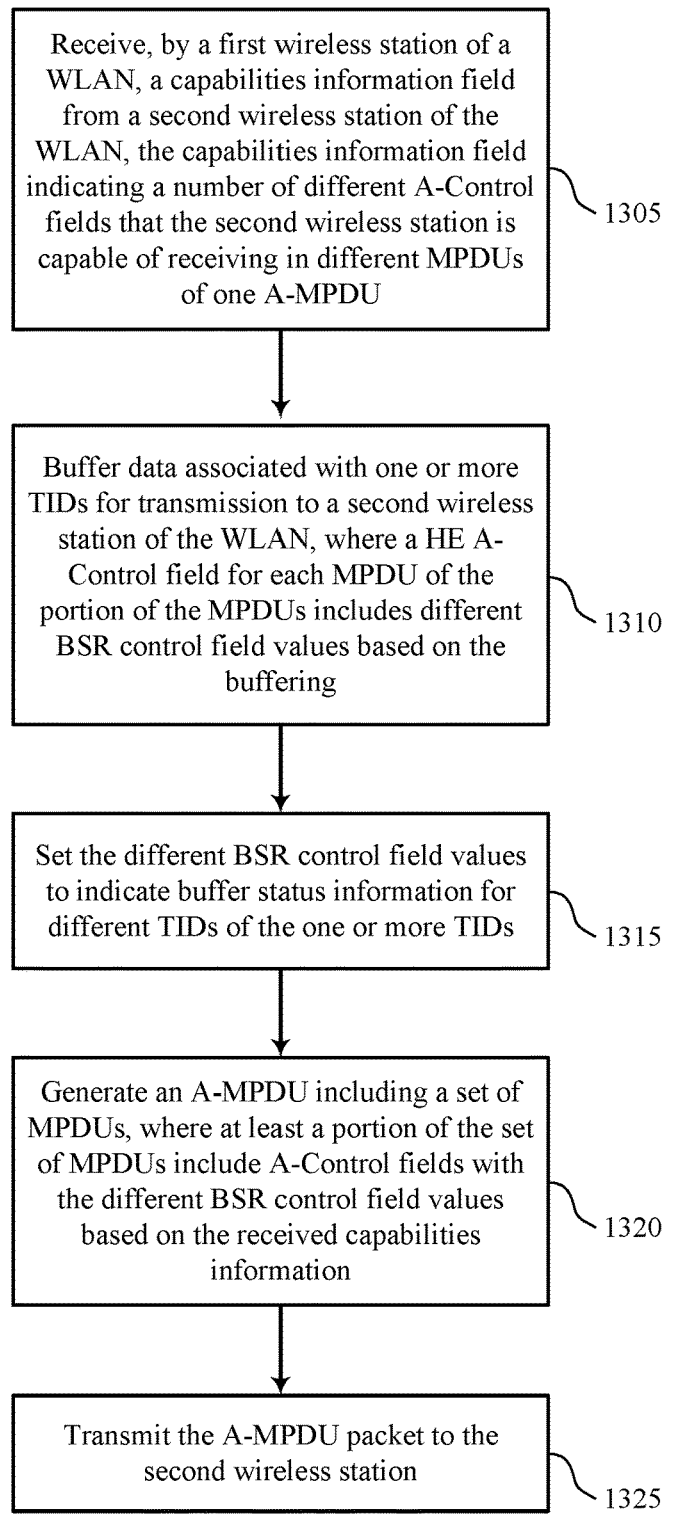

FIG. 13 shows a flowchart illustrating a method 1300 for improved TID based buffer status reporting in accordance with aspects of the present disclosure. The operations of method 1300 may be implemented by a STA 115 or its components as described herein. For example, the operations of method 1300 may be performed by a communications manager as described with reference to FIGS. 7 to 10. In some examples, a STA 115 may execute a set of instructions to control the functional elements of the STA 115 to perform the functions described below. Additionally or alternatively, a STA 115 may perform aspects of the functions described below using special-purpose hardware.

At 1305 the STA 115 may receive, by a first wireless station of a WLAN, a capabilities information field from a second wireless station of the WLAN, the capabilities information field indicating a number of different A-Control fields that a second wireless station is capable of receiving in different MPDUs of one A-MPDU. The operations of 1305 may be performed according to the methods described herein. In some examples, aspects of the operations of 1305 may be performed by an A-MPDU header capabilities manager as described with reference to FIGS. 7 to 10.

At 1310 the STA 115 may buffer data associated with one or more TIDs for transmission to a second wireless station of the WLAN, where an HE A-Control field for each MPDU of the portion of the MPDUs includes different BSR control field values based on the buffering. The operations of 1310 may be performed according to the methods described herein. In some examples, aspects of the operations of 1310 may be performed by a buffer manager as described with reference to FIGS. 7 to 10.

At 1315 the STA 115 may set the different BSR control field values to indicate buffer status information for different TIDs of the one or more TIDs. The operations of 1315 may be performed according to the methods described herein. In some examples, aspects of the operations of 1315 may be performed by a BSR control field manager as described with reference to FIGS. 7 to 10.

At 1320 the STA 115 may generate an A-MPDU including a plurality of MPDUs, where at least a portion of the plurality of MPDUs include different A-Control fields (e.g., at least a portion of the plurality of MPDUs include A-Control fields with the different BSR control field values set at 1315) based on the received capabilities information. The operations of 1320 may be performed according to the methods described herein. In some examples, aspects of the operations of 1320 may be performed by an A-MPDU generator as described with reference to FIGS. 7 to 10.

At 1325 the STA 115 may transmit the A-MPDU packet to the second wireless station. The operations of 1325 may be performed according to the methods described herein. In some examples, aspects of the operations of 1325 may be performed by an MPDU transmitter as described with reference to FIGS. 7 to 10.

Figure 14:
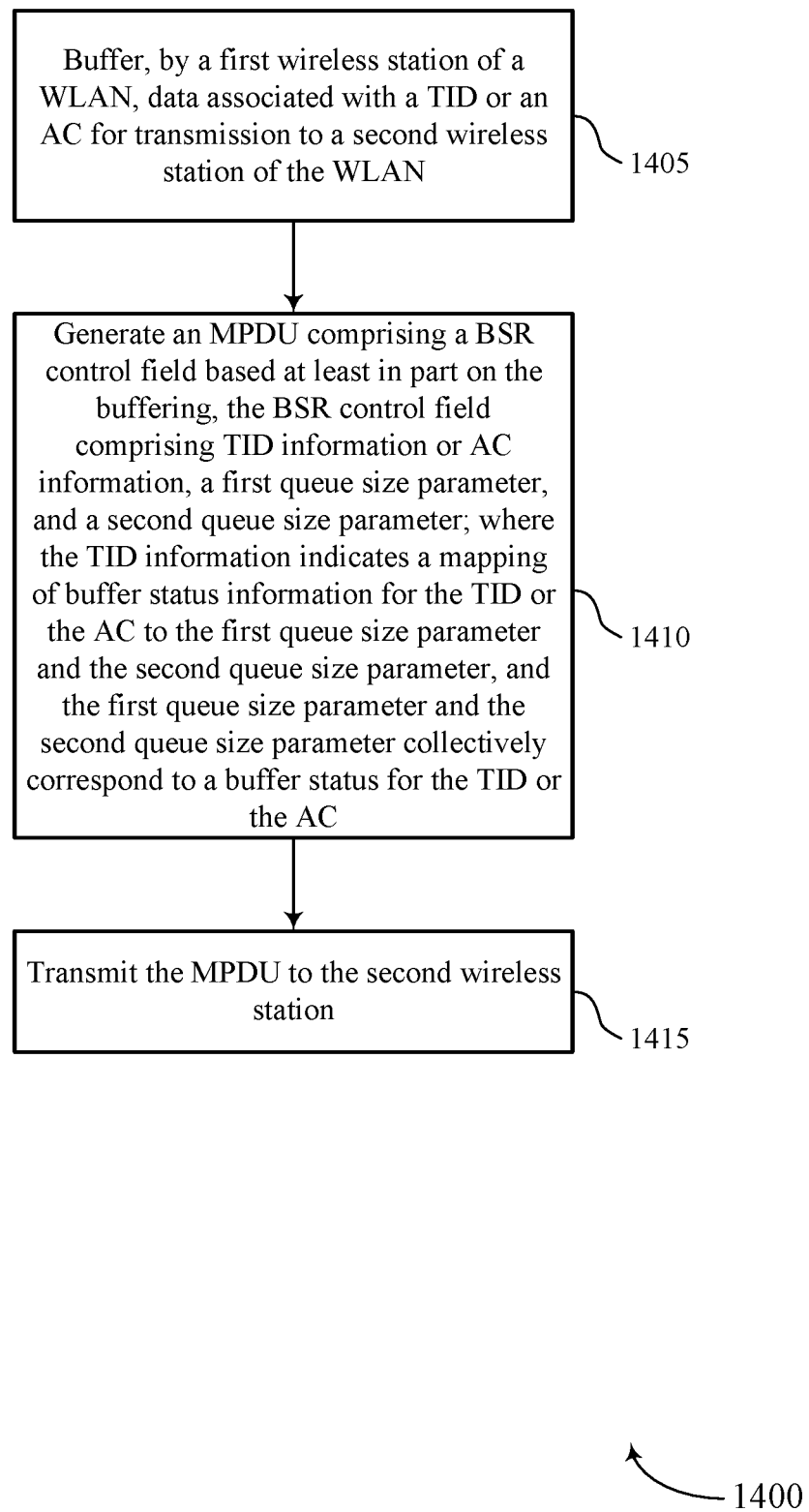

FIG. 14 shows a flowchart illustrating a method 1400 for improved TID based buffer status reporting in accordance with aspects of the present disclosure. The operations of method 1400 may be implemented by a STA 115 or its components as described herein. For example, the operations of method 1400 may be performed by a communications manager as described with reference to FIGS. 7 to 10. In some examples, a STA 115 may execute a set of instructions to control the functional elements of the STA 115 to perform the functions described below. Additionally or alternatively, a STA 115 may perform aspects of the functions described below using special-purpose hardware.

At 1405 the STA 115 may buffer, by a first wireless station of a WLAN, data associated with a TID or an AC for transmission to a second wireless station of the WLAN. The operations of 1405 may be performed according to the methods described herein. In some examples, aspects of the operations of 1405 may be performed by a buffer manager as described with reference to FIGS. 7 to 10.

At 1410 the STA 115 may generate an MPDU comprising a BSR control field based at least in part on the buffering, the BSR control field comprising TID information or AC information, a first queue size parameter, and a second queue size parameter; wherein the TID information indicates a mapping of buffer status information for the TID or the AC to the first queue size parameter and the second queue size parameter, and the first queue size parameter and the second queue size parameter collectively correspond to a buffer status for the TID or the AC. The operations of 1410 may be performed according to the methods described herein. In some examples, aspects of the operations of 1410 may be performed by an MPDU generator as described with reference to FIGS. 7 to 10.

At 1415 the STA 115 may transmit the MPDU to the second wireless station. The operations of 1415 may be performed according to the methods described herein. In some examples, aspects of the operations of 1415 may be performed by an MPDU transmitter as described with reference to FIGS. 7 to 10.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by STAs 115 with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by STAs 115 with service subscriptions with the network provider. A femto cell may also cover a small geographic area (e.g., a home) and may provide restricted access by STAs 115 having an association with the femto cell (e.g., STAs 115 in a closed subscriber group (CSG), STAs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The WLAN 100 or systems described herein may support synchronous or asynchronous operation. For synchronous operation, the APs 105 may have similar frame timing, and transmissions from different APs 105 may be approximately aligned in time. For asynchronous operation, the APs 105 may have different frame timing, and transmissions from different APs 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A wireless device, comprising:
   a wireless modem, wherein the wireless modem is configured to:
   obtain for buffering, by a first wireless station of a wireless local area network (WLAN), data associated with one or more traffic identifiers (TIDs) for transmission to a second wireless station of the WLAN;
   generate a media access control (MAC) protocol data unit (MPDU) comprising a buffer status report (BSR) control field based at least in part on the buffering, the BSR control field comprising an access category identifier (ACI) bitmap, a delta TID parameter, a first queue size parameter, and a second queue size parameter, wherein the ACI bitmap and the delta TID parameter indicate a mapping of buffer status information for the one or more TIDs to a combination of the first queue size parameter and the second queue size parameter; and
   provide for transmission, to the second wireless station, the MPDU.

2. The wireless device of claim 1, wherein the wireless modem is further configured to:
   set a value of the delta TID parameter to indicate at least a number of the one or more TIDs.

3. The wireless device of claim 2, wherein the value of the delta TID parameter indicates that the first queue size parameter and the second queue size parameter collectively correspond to a buffer status for a single TID of the one or more TIDs, and wherein the ACI bitmap indicates an access category (AC) to which the single TID corresponds to.

4. The wireless device of claim 3, wherein the single TID of the one or more TIDs comprises a highest TID of the AC associated with the ACI bitmap or a lowest TID of the AC associated with the ACI bitmap.

5. The wireless device of claim 2, wherein the value of the delta TID parameter indicates that the first queue size parameter corresponds to a first buffer status for a first TID of the one or more TIDs and the second queue size parameter corresponds to a second buffer status for a second TID of the one or more TIDs, and wherein the ACI bitmap indicates an access category (AC) to which the first TID and the second TID correspond to.

6. The wireless device of claim 5, wherein the first TID and the second TID comprise different priority levels.

7. The wireless device of claim 2, wherein the value of the delta TID parameter indicates that the first queue size parameter corresponds to a first buffer status of a first TID of the one or more TIDs and the second queue size parameter corresponds to a second buffer status for a plurality of TIDs of the one or more TIDs.

8. The wireless device of claim 2, wherein the MPDU further comprises a Quality of Service (QoS) control field based at least in part on the buffering, the QoS control field comprising a third queue size parameter and a TID subfield.

9. The wireless device of claim 8, wherein the third queue size parameter and at least one of the first queue size parameter and the second queue size parameter, collectively correspond to a buffer status for a single TID of the one or more TIDs and wherein the ACI bitmap indicates an access category (AC) to which the single TID corresponds to.

10. The wireless device of claim 9, wherein the single TID of the one or more TIDs comprises a highest TID of the AC associated with the ACI bitmap or a lowest TID of the AC associated with the ACI bitmap, and wherein the single TID is indicated by the TID subfield of the QoS control field and the value of the delta TID parameter.

11. The wireless device of claim 8, wherein the TID subfield indicates the third queue size parameter corresponds to a buffer status for a TID other than the one or more TIDs indicated by the value of the delta TID parameter.

12. The wireless device of claim 8, wherein the third queue size parameter corresponds to a buffer status for an access category (AC), and wherein the AC is indicated by the TID subfield.

13. The wireless device of claim 1, wherein configuration of the modem to generate the MPDU configures the modem to:
   set the ACI bitmap to indicate a set of one or more access categories (ACs) including an AC of the one or more TIDs.

14. The wireless device of claim 1, wherein the set of one or more ACs comprises a plurality of access categories (ACs), and the wireless modem is further configured to:
   set an AC high parameter of the BSR control field to indicate the AC of the one or more TIDs.

15. The wireless device of claim 1, wherein the one or more TIDs comprise an access category (AC).

16. The wireless device of claim 1, wherein the BSR control field further comprises an access category indicator High (ACI High) parameter and a scaling factor parameter.

17. The wireless device of claim 16, wherein the ACI bitmap indicates a single access category (AC), and wherein the ACI High parameter and the scaling factor collectively correspond to a scaling factor value associated with the first queue size parameter and the second queue size parameter.

18. The wireless device of claim 16, wherein the ACI bitmap indicates a single access category (AC), and wherein the ACI High parameter corresponds to a first scaling factor value associated with the first queue size parameter and the scaling factor corresponds to a second scaling factor value associated with the second queue size parameter.

19. The wireless device of claim 16, wherein configuration of the modem to generate the MPDU configures the modem to:
set a value of the ACI bitmap, the delta TID parameter, and the ACI High parameter to collectively indicate the one or more TIDs.

20. The wireless device of claim 19, wherein the scaling factor parameter indicates that the first queue size parameter corresponds to a buffer status for a first TID of the one or more TIDs, wherein the second queue size parameter corresponds to TIDs of the one or more TIDs other than the first TID.

21. The wireless device of claim 19, wherein the value of the ACI bitmap, the delta TID parameter, and the ACI High parameter collectively indicates one TID, and wherein the first queue size parameter and the second queue size parameter collectively correspond to a buffer status for the one TID.

22. The wireless device of claim 1, wherein the ACI bitmap indicates a value corresponding to a TID of the one or more TIDs.

23. The wireless device of claim 22, wherein the first queue size parameter and the second queue size parameter collectively correspond to a buffer status for the TID.

24. The wireless device of claim 1, wherein the ACI bitmap and the delta TID parameter collectively indicate a value corresponding to a first TID and a second TID of the one or more TIDs.

25. The wireless device of claim 24, wherein the first queue size parameter corresponds to a first buffer status for the first TID and the second queue size parameter corresponds to a second buffer status for the second TID.

26. A wireless device, comprising:
a wireless modem, wherein the wireless modem is configured to:
provide for buffering, by a first wireless station of a wireless local area network (WLAN), data associated with a traffic identifier (TID) or an access category (AC) for transmission to a second wireless station of the WLAN;
generate a media access control (MAC) protocol data unit (MPDU) comprising a buffer status report (BSR) control field based at least in part on the buffering, the BSR control field comprising TID information or AC information, a first queue size parameter, and a second queue size parameter, wherein the TID information indicates a mapping of buffer status information for the TID or the AC to a combination of the first queue size parameter and the second queue size parameter, and the first queue size parameter and the second queue size parameter collectively correspond to a buffer status for the TID or the AC; and
provide for transmission, to the second device, the MPDU.

27. The wireless device of claim 26, wherein the wireless modem is further configured to:
determine the buffer status based at least in part on the data provided for buffering; and
determine the first queue size parameter and the second queue size parameter, wherein a summation of the first queue size parameter and the second queue size parameter indicate the buffer status.

28. The wireless device of claim 27, wherein the MPDU further comprises a Quality of Service (QoS) control field, and wherein configuration of the wireless modem to generate the MPDU configures the wireless modem to:
determine the buffer status base at least in part on the data provided for buffering; and
determine the first queue size parameter, the second queue size parameter, and a third queue size parameter corresponding to the QoS control field, wherein a summation of the first queue size parameter, the second queue size parameter, and the third queue size parameter indicate the buffer status.

29. A method for wireless communication, comprising:
buffering, by a first wireless station of a wireless local area network (WLAN), data associated with one or more traffic identifiers (TIDs) for transmission to a second wireless station of the WLAN;
generating a media access control (MAC) protocol data unit (MPDU) comprising a buffer status report (BSR) control field based at least in part on the buffering, the BSR control field comprising an access category identifier (ACI) bitmap, a delta TID parameter, a first queue size parameter, and a second queue size parameter, wherein the ACI bitmap and the delta TID parameter indicate a mapping of buffer status information for the one or more TIDs to a combination of the first queue size parameter and the second queue size parameter; and
transmitting the MPDU to the second wireless station.

30. A method for wireless communication, comprising:
buffering, by a first wireless station of a wireless local area network (WLAN), data associated with a traffic identifier (TID) or an access category (AC) for transmission to a second wireless station of the WLAN;
generating a media access control (MAC) protocol data unit (MPDU) comprising a buffer status report (BSR) control field based at least in part on the buffering, the BSR control field comprising TID information or AC information, a first queue size parameter, and a second queue size parameter, wherein the TID information or AC information indicates a mapping of buffer status information for the TID or the AC to a combination of the first queue size parameter and the second queue size parameter, and the first queue size parameter and the second queue size parameter collectively correspond to a buffer status for the TID or the AC; and
transmitting the MPDU to the second wireless station.

* * * * *